(12) United States Patent
Kondo et al.

(10) Patent No.: US 6,591,398 B1
(45) Date of Patent: Jul. 8, 2003

(54) MULTIPLE PROCESSING SYSTEM

(75) Inventors: Tetsujiro Kondo, Kanagawa-Prefecture (JP); Yasuhiro Fujimori, Cupertino, CA (US); Sugata Ghosal, San Jose, CA (US); James J. Carrig, San Jose, CA (US); Tsutomu Watanabe, Kanagawa-Prefecture (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/249,493

(22) Filed: Feb. 12, 1999

(51) Int. Cl.$^7$ ................................................ H04N 5/21
(52) U.S. Cl. ...................... 714/825; 348/607; 348/451; 382/260
(58) Field of Search ................................. 714/825, 817; 708/300, 313, 316; 704/226, 227, 228, 501; 364/571.01; 360/51, 25; 375/326–327, 343, 240.12; 386/50, 113, 114, 68, 73; 382/275, 284, 276, 265, 254, 260; 348/584, 620, 720, 627, 701, 908, 909, 699, 451

(56) References Cited

U.S. PATENT DOCUMENTS

| | | | |
|---|---|---|---|
| 3,311,879 A | 3/1967 | Daher | 714/779 |
| 3,805,232 A | 4/1974 | Allen | 714/779 |
| 4,361,853 A | 11/1982 | Remy et al. | |
| 4,381,519 A | 4/1983 | Wilkinson et al. | 358/21 R |
| 4,419,693 A | 12/1983 | Wilkinson et al. | 358/167 |
| 4,438,438 A | 3/1984 | Arens et al. | 342/451 |
| 4,532,628 A | 7/1985 | Matthews | 714/6 |
| 4,574,393 A | 3/1986 | Blackwell et al. | 382/162 |
| 4,703,351 A | 10/1987 | Kondo | 358/135 |
| 4,703,352 A | 10/1987 | Kondo | 358/135 |
| 4,710,811 A | 12/1987 | Kondo | 358/135 |
| 4,722,003 A | 1/1988 | Kondo | 358/135 |
| 4,729,021 A | 3/1988 | Kondo | 348/421 |

(List continued on next page.)

FOREIGN PATENT DOCUMENTS

| | | | |
|---|---|---|---|
| EP | 0 398 741 A | 11/1990 | |
| EP | 0 527 611 | 8/1992 | H04N/9/80 |
| EP | 0 558 016 | 2/1993 | H04N/7/133 |

(List continued on next page.)

OTHER PUBLICATIONS

Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.

(List continued on next page.)

*Primary Examiner*—Albert DeCady
*Assistant Examiner*—Guy Lamarre
(74) *Attorney, Agent, or Firm*—Blakely, Sokoloff, Taylor & Zafman LLP

(57) ABSTRACT

An apparatus, method, and computer-readable medium for selectively performing, in parallel structures, different functions on an input image, sound data or other correlated data. An input is configured to receive the input data. There are at least two circuits, each circuit is coupled to the input and each circuit is configured to perform a different function on the input data. A motion-detection circuit is coupled to the input and each of the at least two circuits. The motion-detection circuit is configured to determine a level of change in the input data and generate an output of motion data. The motion data is used by each of the at least two circuits to perform its corresponding function. A select device is coupled to each of the at least two circuits and a control input. The select device is configured to select as output data, the output of one of the at least two circuits based upon the control input. The different functions performed on the input data may be selected from the group consisting of recovering erroneous data contained in the input data, interpolating the input data, and reducing the noise level of the input data.

15 Claims, 21 Drawing Sheets

U.S. PATENT DOCUMENTS

| | | | |
|---|---|---|---|
| 4,772,947 A | 9/1988 | Kono | 358/135 |
| 4,788,589 A | 11/1988 | Kondo | 358/133 |
| 4,845,557 A * | 7/1989 | Lang | 348/452 |
| 4,845,560 A | 7/1989 | Kondo et al. | 358/133 |
| 4,890,161 A | 12/1989 | Kondo | 358/135 |
| 4,924,310 A | 5/1990 | Von Brandt | 358/136 |
| 4,953,023 A | 8/1990 | Kondo | 358/135 |
| 4,975,915 A | 12/1990 | Sako et al. | 714/755 |
| 4,979,040 A * | 12/1990 | Masumoto | 348/424 |
| 5,023,710 A | 6/1991 | Kondo et al. | 358/133 |
| 5,043,810 A | 8/1991 | Vreeswijk et al. | 348/413 |
| 5,086,489 A | 2/1992 | Shimura | |
| 5,089,889 A * | 2/1992 | Sugiyama | 375/240.03 |
| 5,093,722 A * | 3/1992 | Miyaguchi et al. | 348/441 |
| 5,093,872 A | 3/1992 | Tutt | |
| 5,101,446 A | 3/1992 | Resnikoff et al. | |
| 5,122,873 A | 6/1992 | Golin | 348/390 |
| 5,134,479 A | 7/1992 | Ohishi | 348/556 |
| 5,142,537 A | 8/1992 | Kurtner et al. | 371/31 |
| 5,150,210 A * | 9/1992 | Hoshi et al. | 348/411 |
| 5,159,452 A | 10/1992 | Kinoshita | 348/466 |
| 5,166,987 A | 11/1992 | Kageyama | |
| 5,177,797 A | 1/1993 | Takenaka et al. | |
| 5,185,746 A | 2/1993 | Tanaka et al. | 714/770 |
| 5,196,931 A | 3/1993 | Kondo | 358/133 |
| 5,208,816 A | 5/1993 | Seshardi et al. | 371/43 |
| 5,237,424 A | 8/1993 | Nishino et al. | 358/310 |
| 5,241,381 A | 8/1993 | Kondo | 358/133 |
| 5,243,428 A | 9/1993 | Challapali et al. | 348/607 |
| 5,258,835 A | 11/1993 | Kato | 358/135 |
| 5,307,175 A | 4/1994 | Seachman | 358/401 |
| 5,327,502 A | 7/1994 | Katata et al. | 382/56 |
| 5,337,087 A | 8/1994 | Mishima | |
| 5,373,455 A * | 12/1994 | Edgar | 364/571.01 |
| 5,379,072 A | 1/1995 | Kondo | 348/441 |
| 5,398,078 A | 3/1995 | Masuda et al. | 348/699 |
| 5,406,334 A | 4/1995 | Kondo et al. | 348/581 |
| 5,416,651 A | 5/1995 | Uetake et al. | 360/48 |
| 5,416,847 A | 5/1995 | Boze | 381/94.3 |
| 5,428,403 A | 6/1995 | Andrew et al. | 348/699 |
| 5,434,716 A | 7/1995 | Sugiyama et al. | 360/32 |
| 5,438,369 A | 8/1995 | Citta et al. | 348/470 |
| 5,442,409 A * | 8/1995 | Morgan | 348/699 |
| 5,446,456 A | 8/1995 | Seo | |
| 5,455,629 A * | 10/1995 | Sun et al. | 348/845.1 |
| 5,469,216 A | 11/1995 | Takahashi et al. | 349/441 |
| 5,469,474 A | 11/1995 | Kitabatake | 375/243 |
| 5,473,479 A | 12/1995 | Takahura | |
| 5,481,554 A | 1/1996 | Kondo | 371/53 |
| 5,481,627 A | 1/1996 | Kim | 382/254 |
| 5,495,298 A | 2/1996 | Uchida et al. | 348/615 |
| 5,499,057 A * | 3/1996 | Kondo et al. | 348/607 |
| 5,528,608 A | 6/1996 | Shimizume | 371/40.3 |
| 5,557,420 A | 9/1996 | Yanagihara et al. | |
| 5,557,479 A | 9/1996 | Yanagihara | |
| 5,568,196 A | 10/1996 | Hamada et al. | 348/416.1 |
| 5,571,862 A | 11/1996 | Santini et al. | 524/801 |
| 5,577,053 A | 11/1996 | Dent | 714/755 |
| 5,579,051 A | 11/1996 | Murakami et al. | 348/409.1 |
| 5,594,807 A | 1/1997 | Liu | 382/128 |
| 5,598,214 A | 1/1997 | Kondo et al. | 348/414 |
| 5,617,333 A | 4/1997 | Oyamada et al. | 709/247 |
| 5,625,715 A | 4/1997 | Trew et al. | 382/254 |
| 5,636,316 A | 6/1997 | Oku et al. | 386/112 |
| 5,649,053 A | 7/1997 | Kim | 704/229 |
| 5,663,764 A | 9/1997 | Kondo et al. | 348/414 |
| 5,673,357 A | 9/1997 | Shima | |
| 5,677,734 A | 10/1997 | Oikawa et al. | |
| 5,689,302 A | 11/1997 | Jones | |
| 5,699,475 A | 12/1997 | Oguro et al. | |
| 5,715,000 A * | 2/1998 | Inamori | 348/241 |
| 5,724,099 A | 3/1998 | Hamdi et al. | 348/419 |
| 5,724,369 A | 3/1998 | Brailean et al. | |
| 5,737,022 A * | 4/1998 | Yamaguchi et al. | 348/416 |
| 5,751,361 A * | 5/1998 | Kim | 348/409 |
| 5,756,857 A | 5/1998 | Kuribayashi et al. | 568/579 |
| 5,778,097 A | 7/1998 | Nickerson | 382/236 |
| 5,786,857 A | 7/1998 | Yamaguchi | 348/405 |
| 5,790,195 A | 8/1998 | Ohsawa | 348/419 |
| 5,793,432 A * | 8/1998 | Mishima et al. | 375/240.01 |
| 5,805,762 A | 9/1998 | Boyce et al. | 386/68 |
| 5,809,231 A | 9/1998 | Yokoyama et al. | |
| 5,812,195 A * | 9/1998 | Zhang | 348/415 |
| 5,852,470 A | 12/1998 | Kondo et al. | 348/448 |
| 5,861,922 A | 1/1999 | Murashita et al. | 348/420 |
| 5,878,183 A | 3/1999 | Sugiyama et al. | 386/96 |
| 5,894,526 A | 4/1999 | Watanabe et al. | 382/236 |
| 5,903,481 A | 5/1999 | Kondo et al. | |
| 5,903,672 A | 5/1999 | Yu | 382/236 |
| 5,917,554 A * | 6/1999 | Ohta | 348/451 |
| 5,928,318 A | 7/1999 | Araki | |
| 5,936,674 A | 8/1999 | Kim | 348/420 |
| 5,940,539 A | 8/1999 | Kondo et al. | 382/236 |
| 5,946,044 A | 8/1999 | Kondo et al. | 348/458 |
| 5,991,447 A | 11/1999 | Eifrig et al. | 382/236 |
| 5,999,231 A * | 12/1999 | Mancuso et al. | 348/607 |
| 6,067,636 A | 5/2000 | Yao et al. | 714/15 |
| 6,230,123 B1 * | 5/2001 | Mekuria et al. | 704/226 |

FOREIGN PATENT DOCUMENTS

| | | | |
|---|---|---|---|
| EP | 0 566 412 A2 | 4/1993 | |
| EP | 0 571 180 A2 | 5/1993 | |
| EP | 0 592 196 A2 | 10/1993 | |
| EP | 0 596 826 | 11/1993 | H04N/5/92 |
| EP | 0 605 209 A2 | 12/1993 | |
| EP | 0 610 587 | 12/1993 | |
| EP | 0 592 196 A2 | 4/1994 | |
| EP | 0 597 576 A | 5/1994 | |
| EP | 0 651 584 A2 | 10/1994 | |
| EP | 0 680 209 | 4/1995 | H04N/5/91 |
| EP | 0 746 157 A2 | 5/1996 | |
| EP | 0 833 517 | 4/1998 | H04N/7/30 |
| GB | 2 280 812 A | 2/1995 | |
| GB | 2 320 836 A | 11/1997 | |
| JP | 7-67028 | 3/1995 | H04N/5/235 |
| WO | WO96/07987 | 9/1993 | |
| WO | WO 97/46019 | 12/1997 | |
| WO | WO99/21285 | 10/1998 | |
| WO | 99 21090 A | 4/1999 | |
| WO | WO 00/48126 | 8/2000 | |

OTHER PUBLICATIONS

Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Translation of Abstract of Japanese Patent No. 61147690.
Translation of Abstract of Japanese Patent No. 63256080..
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.

Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
NHK Laboratories Note, "Error Correction, Concealment and Shuffling", No. 424, Mar. 1994, pp. 29–44.
Translation of Japanese Patent #7–67028, 30 pgs.
Kondo, et al., "Adaptive Dynamic Range Coding Scheme for Future Consumer Digital VTR", pp. 219–226.
Kim, et al., "Bit Rate Reduction Algorithm for a Digital VCR", IEEE Transactions on Consumer Electronics, vol. 37, No. 3, Aug. 1, 1992, pp. 267–274.
Kondo, et al., "Adaptive Dynamic Range Coding Scheme for Future HDTV Digital VTR", Fourth International Workshop on HDTV and Beyond, Sep. 4–6, Turin, Italy.
Kondo, et al., "A New Concealment method for Digital VCR's", IEEE Visual Signal Processing and Communication, pp. 20–22, 9/93, Melbourne, Australia.
Park, et al., "A Simple Concealment for ATM Bursty Cell Loss", IEEE Transactions on Consumer Electronics, No. 3, Aug. 1993, pp. 704–709.
Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.
Stammnitz, et al., "Digital HDTV Experimental System", pp. 535–542.
Chu, et al., Detection and Concealment of Transmission Errors in H.261 Images, XP–000737027, pp. 74–84, IEEE Transactions, Feb. 1998.
Park, et al., "Recovery of Block coded Images from Channel Error", pp. 396–400, pub. date May 23, 1993.
Jeng, et al., "Concealment of Bit Error and Cell Loss in Inter–Frame Coded Video Transmission", 1991 Ieee, 17.4.1–17.4.5.
Monet, et al., "Block Adaptive Quantization of Images", IEEE 1993, pp. 303–306.
Meguro, et al., "An Adaptive Order Statistics Filter Based on Fuzzy Rules for Image Processing", pp. 70–80, XP–00755627, 1997 Scripta Technica, Inc.
International Search Report PCT/00/25223, 7 pages, Dec. 7, 2000.
Meguro, et al., *"An Adaptive Order Statistics Filter Based On Fuzzy Rules For Image Processing"*, p. 70–80, © 1997 Scripta Technica, Inc.
PCT Written Opinion PCT/US00/03738, 7 pgs., Jan. 26, 2001.
International Search Report PCT/US00/23035, 5 pgs., Jan. 22, 2001.

* cited by examiner

ERROR CLASS 0
(INDEPENDENT ERROR)

ERROR CLASS 1
(LEFT ERRONEOUS CASE)

ERROR CLASS 2
(RIGHT ERRONEOUS CASE)

ERROR CLASS 3
(CONSECUTIVE ERRONEOUS CASE)

——————— : FIRST FIELD

— — — — : SECOND FIELD

——— : FIRST FIELD

— — — — :SECOND FIELD

ERROR CLASS0 (INDEPENDENT ERRONEOUS CASE)

ERROR CLASS 1 (LEFT ERRONEOUS CASE)

——————— : FIRST FIELD

— — — — : SECOND FIELD

ERROR CLASS 2 (INDEPENDENT ERRONEOUS CASE)

(CURRENT FRAME)

(PREVIOUS FRAME)

(MOTION CLASS = 0, 1)

(CURRENT FRAME)
(MOTION CLASS = 2)

(CURRENT FRAME)
(MOTION CLASS = 3)

| ERROR FLAG | SUBSAMPLE FLAG | MOTION CLASS ID | OUTPUT SELECTED |
|---|---|---|---|
| 0 | 0 | 0 | NOISE-REDUCTION STATIONARY DATA |
| 0 | 0 | 1, 2, 3 | NOISE-REDUCTION MOTION DATA |
| 0 | 1 | 0 | SUBSAMPLE INTERPOLATED DATA |
| 0 | 1 | 1, 2, 3 | SUBSAMPLE INTERPOLATED DATA |
| 1 | 0 | 0 | ERROR RECOVERED DATA |
| 1 | 0 | 1, 2, 3 | ERROR RECOVERED DATA |
| 1 | 1 | 0 | ERROR RECOVERED DATA |
| 1 | 1 | 1, 2, 3 | ERROR RECOVERED DATA |

FIG. 13

MULTIPLE PROCESSING SYSTEM

FIELD OF THE INVENTION

The present invention relates to the processing of video image, sound, or other correlated data. More specifically, the present invention relates to an apparatus, method, and computer-readable medium for selectively performing, in parallel structures, different functions on input image, sound, or other correlated data based upon input processing selection signals.

BACKGROUND OF THE INVENTION

It is often necessary to perform different functions on input image, sound, or other correlated data in order to obtain quality output data. The different functions that need to be performed on the input data may include the following: concealing or recovering erroneous or lost input data (hereinafter also referred to as error recovery), reducing the noise level of the input data (hereinafter also referred to as noise reduction), and interpolating subsamples of the input data (hereinafter also referred to as subsample interpolation).

Conventionally, error recovery has been achieved by correlation evaluation. For example, spatial inclinations of the target data are detected using neighboring data. In addition to spatial inclinations, motion is also evaluated. A selected spatial filter is used for error recovery if motion is detected. In the case of stationary data, the previous frame data is used for error recovery.

Subsample interpolation processing has conventionally been achieved by peripheral correlation evaluation.

In addition to the conventional method, subsample interpolation can be performed by a method known as classified adaptive subsample interpolation. For further information regarding this method, see U.S. Pat. No. 5,469,216 to Takahashi et al., entitled "Apparatus And Method For Processing A Digital Video Signal To Produce Interpolated Data", which is incorporated herein by reference. In this process the interpolated output data is generated for corresponding data based on the class identifiers of various classes associated with the data.

A conventional noise reduction system may include two components. One component, known as inter-frame processing, is used to perform noise reduction in areas of stationary data. The other component, known as intra-field processing, is used to perform noise reduction for areas of motion. Whether inter-frame processing or intra-field processing is performed depends on the level of motion of the target data.

Conventionally, the different functions or processes mentioned above have been performed independently and separately by different systems or circuits. Thus, if two or more functions need to be performed on the input data, two or more systems are needed to carry out the required functions. For example, if both error recovery and noise reduction are to be performed on input data, the input data would be processed separately by an error recovery system to obtain error recovered data. The error recovered data would then be processed by a noise reduction system to obtain noise-reduced output data.

The systems described above are complex to implement and typically include significant hardware redundancy. In addition, the conventional serial, pipelined structure also causes other processing inefficiencies. For example, even if only a small portion of the input data contains errors, the entire stream of input data would be processed through the error recovery process. Such indiscriminate processing of input data regardless of the condition of the input data results in significant waste of processing time and resources.

Moreover, since the entire input data are processed through all the different processes in this serial, pipelined configuration, there is no control mechanism to control how different portions of the input data should be processed. For example, the users cannot choose to perform only noise reduction on some portions of the data and error recovery on other portions of the data.

SUMMARY OF THE INVENTION

The present invention provides a method, apparatus, and computer-readable medium for selectively performing, in parallel structures, different functions on an input image, sound data, or other correlated data according to some input processing selection signals. In one embodiment, the input data is received. A first function is performed on the input data to generate a first output of data. At least one additional function, approximately in parallel to the step of performing the first function, is performed on the input data to generate at least one additional output of data. Either the first output or the additional output is selected based upon a control input. In one embodiment, the first function and each additional function performed on the input data are selected from the group consisting of recovering erroneous data contained in the input data, interpolating the input data, and reducing the noise level of the input data.

BRIEF DESCRIPTION OF THE DRAWINGS

The features and advantages of the present invention will be more fully understood by reference to the accompanying drawings, in which:

FIG. 13 shows an output selection truth table of one embodiment in accordance with one embodiment of the present invention.

DETAILED DESCRIPTION

In the following detailed description numerous specific details are set forth in order to provide a thorough understanding of the present invention. However, it will be obvious to one skilled in the art that the present invention may be practiced without these specific details.

In the discussion below, the teachings of the present invention are utilized to implement a multiple processing system that selectively performs different processes such as error recovery, noise reduction, and subsample interpolation. However, the present invention is not limited to these processes and can be applied to other processes utilized to manipulate correlated data, including sound or image data.

Figure 1:
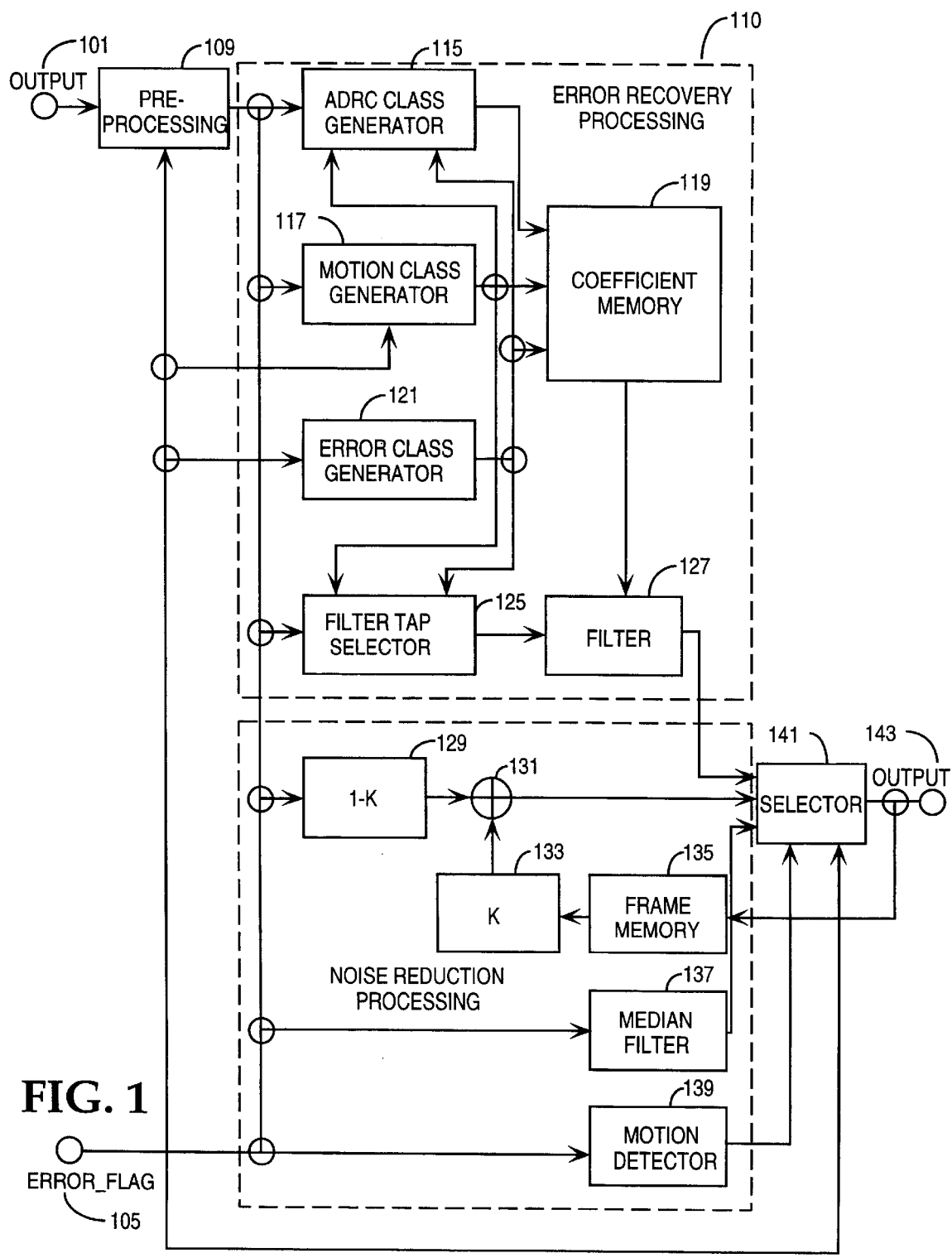
FIG. 1 is a simplified block diagram of one embodiment of a multiple processing system in accordance with the teachings of the present invention.

FIG. 1 is a system block diagram of one embodiment of a multiple processing system in accordance with the teachings of the present invention. In this embodiment, the system is configured to selectively perform classified adaptive error recovery and noise reduction in a parallel structure.

Input data 101 and corresponding error flags 105 are input to the system. The input data 101 may be video image, sound, or other correlated data. In one embodiment, the input data 101 is digital image data represented by discrete data points that are commonly known as pixels. Each data point can be represented independently, for example, using 8-bit binary number. Data points can also be represented by other alternative representations, for example, by dividing the raw data into disjoint sets of data points, known as blocks.

The error flag 105 is used to indicate the locations within the input data 101 that contain erroneous samples. For example, the error flag may be used to indicate whether a data point being processed contains errors or is unknown, unreliable or unavailable.

The input data 101 and error flag 105 are input to the pre-processor 109 to generate pre-processed data. The data is pre-processed to provide estimates of input data containing errors. Such data is valuable for subsequent processing as described below. In one embodiment, the pre-processed data is proposed output values of data which have corresponding error flags set (referred to herein as target data). The proposed value of erroneous data is generated from associated taps. In one embodiment the taps are either one of the neighboring or peripheral data or a combination of multiple peripheral data. In one embodiment, if the error flag is set for the target data and not set for peripheral data horizontally adjacent to the target data, the target data is replaced with horizontal peripheral data. If the peripheral data located horizontally to the erroneous target data also contains errors, peripheral data located vertically to the target data is used. If the vertical peripheral data also contains errors, previous frame data is used.

Figure 2A:
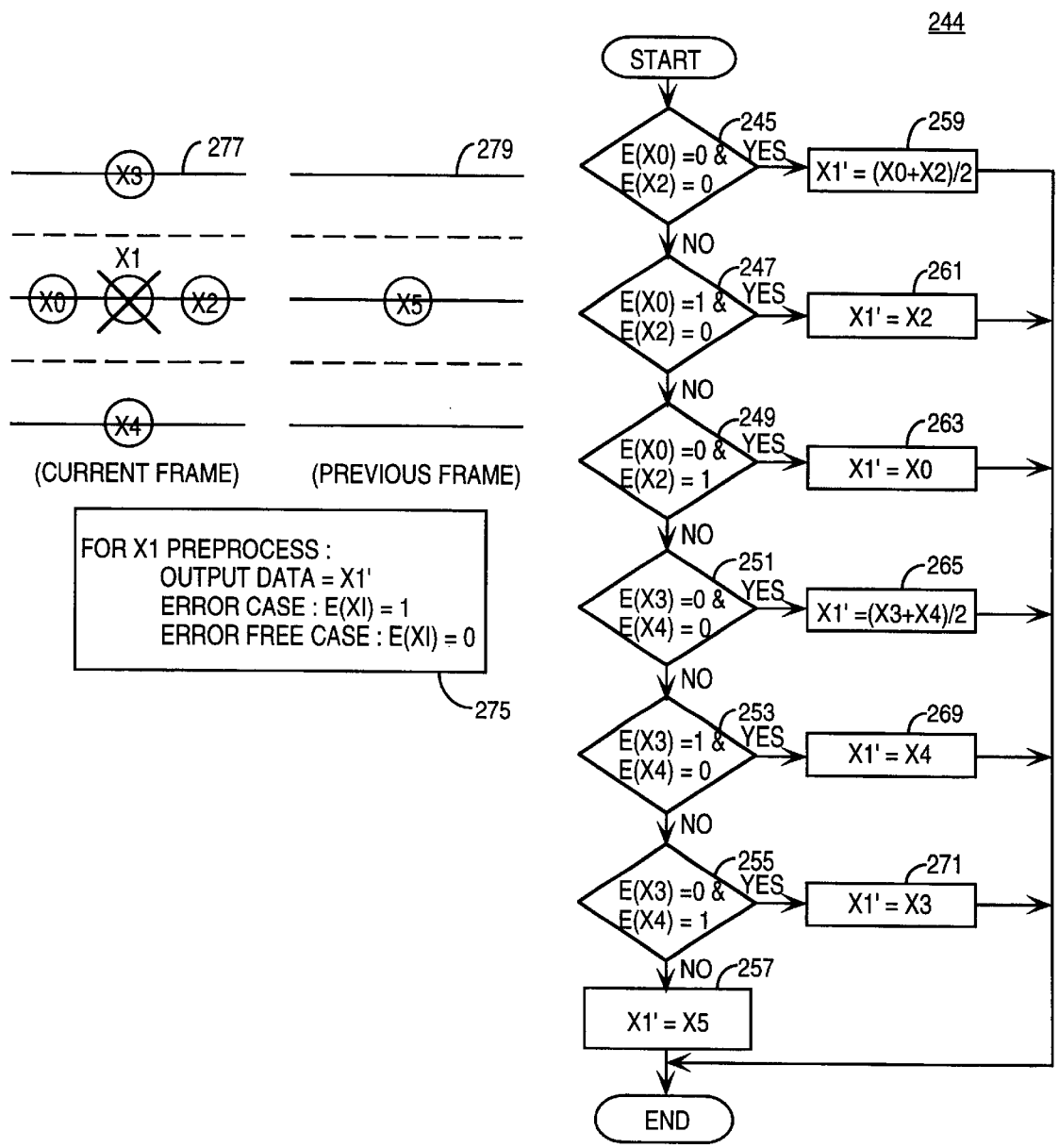
FIG. 2a shows one embodiment of a pre-processing algorithm in accordance with the teachings of the present invention.

An example of a pre-processing algorithm is illustrated in FIG. 2a. In this example, the target pixel X1 in the current frame 277 is being pre-processed and an associated error flag has been set indicating an error with respect to X1. In the present example, the peripheral data used to pre-process X1 are pixels X0, X2, X3 and X4 of the current frame 277 and pixel X5 of the previous frame 279. As noted by item 275, X1' is the proposed value for the target data X1. The error flag E(Xi) corresponding to the peripheral data Xi and is set to 1 if the peripheral data Xi contains errors and set to zero if no error has been detected.

Referring to flow chart 244, at step 245, if the error flags corresponding to pixels X0 and X2 indicate no errors, then X1' is set to be the average of X0 and X2, step 259. Otherwise; at step 247, if the error flag corresponding to X0 is set, then X1' is set to equal X2, step 261. At step 249, if the error flag for X2 is set, then X1' is set to equal X0, step 263. If the error flags for the vertically located peripheral data, X3, X4 are not set, then X1' is set to be the average of X3 and X4, step 265. Alternately, if the error flag for X3 is set, step 253, then X1' is set to equal X4, step 269. If the error flag for X4 is set, step 255, then X1' is set to equal X3, step 271. Alternately, at step 257, if the peripheral pixels located horizontally and vertically to the target data X1 are erroneous, then X1' is set to equal a co-located pixel from a prior frame X5, step 257.

Figure 2B:
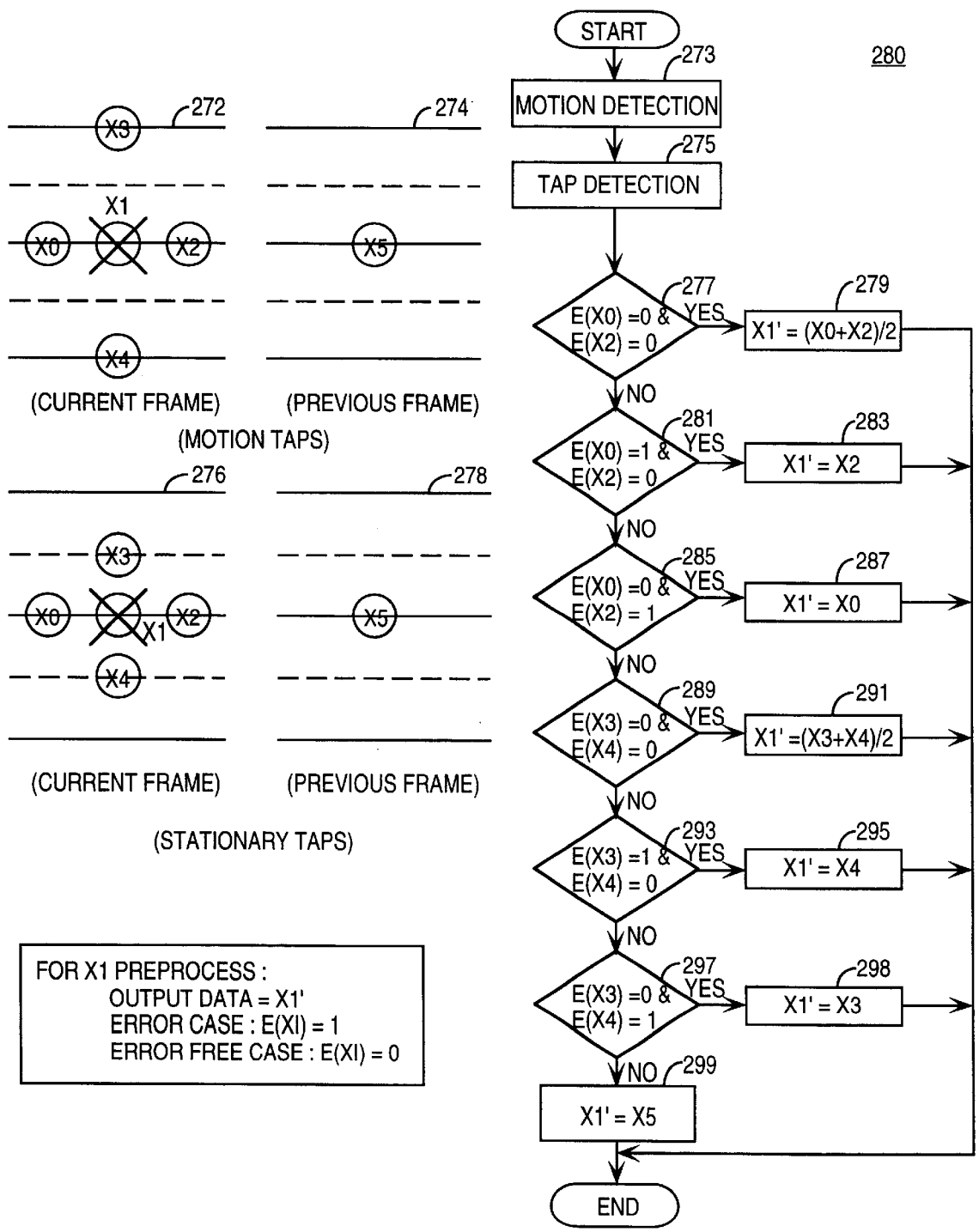
FIG. 2b shows an alternate embodiment of a processing algorithm in accordance with one embodiment of the present invention.

An alternate pre-processing algorithm is illustrated in FIG. 2b. In this embodiment, motion information is used to determine the peripheral data to be used to generate the pre-processed output X1'. For example, if motion is detected, the peripheral data of the current frame to use are identified in frame 272 and the data of the previous frame to use is shown in frame 274. If no motion is detected, i.e., the data is stationary and has not changed, field information may be used as illustrated by frame 276. Previous frame data of frame 278 is also used. Frames 272, 274, 276 and 278 are just one example of taps to use. Alternate tap structures may also be used.

In the system implementing the pre-processing algorithm of FIG. 2b, the motion value is determined by the preprocessor 109 (FIG. 1). Alternately, the system may include a control input indicative of motion coupled to the preprocessor. In one embodiment, motion is detected by averaging motion information from error free peripheral data and comparing the averaged motion value to a predetermined threshold indicative of motion.

One embodiment of the pre-process using motion information is illustrated in flow chart 280. At step 273, the peripheral data is evaluated to determine whether the motion threshold has been met. At step 275, the taps are selected based on whether motion has been detected. Thus, in the present embodiment and as noted above, if motion is detected, the taps illustrated in frames 272 and 274 are used; if motion is not detected, the taps illustrated in frames 276 and 278 are used.

Once the taps are identified, steps 277, 279, 281, 283, 285, 287, 289, 291, 293, 295, 297, 298 and 299 are selectively performed to generate the output X1' based upon the selected taps.

Referring back to FIG. 1, the input data 101, particularly data pre-processed by preprocessor 109 is input to error recovery processing circuitry 110 and noise reduction processing circuitry 112. The circuitries 110, 112 process the data in parallel and forward the processed data to the selector 141. As will be described below, the output 143 is selected by selector 141 based upon the value of the error flag 105 and outputs of error recovery processing circuitry 110 and noise reduction processing circuitry 112.

Error recovery processing circuitry 110 includes a plurality of class generators 115, 117, 121, which generate class identifiers used to select filter taps and coefficients used by filter 127 to process a target data. Target data is the particular data whose value is to be determined or estimated.

A class can be thought of as a collection of specific values used to describe certain characteristics of the target data. A variety of different types of classes exist, for example, a motion class, a spatial class, an error class, a spatial activity class, etc. A class may be defined based on one or more characteristics of the target data. A class may also be defined based on one or more characteristics of the group containing the target data. In the following discussion, the present invention will be discussed in terms of a motion class, an error class and a spatial class. Other types of classes can be used.

A motion class can be thought of as a collection of specific values used to describe the motion characteristic of the target data. In one embodiment, the motion class is defined based on the different levels of motion of the block containing the target data, for example, no motion in the block, little motion in the block, or large motion in the block.

An error class can be thought of as a collection of specific values used to describe the various distribution patterns of erroneous data in the neighborhood of the target data. In one embodiment, an error class is defined to indicate whether the data adjacent to the target data are erroneous.

A spatial class can be thought of as a collection of specific values used to describe the spatial characteristic of the target data. Spatial classification of the data may be determined using Adaptive Dynamic Range Coding (ADRC), for purposes of the discussion herein, a spatial class determined by ADRC is referred to as an ADRC class, Differential PCM, Vector Quantization, Discrete Cosine Transform, etc. For further information on ADRC, see "Adaptive Dynamic Range Coding Scheme for Future HDTV Digital VTR", Kondo, Fujimori and Nakaya, Fourth International Workshop on HDTV and Beyond, Sep. 4–6, 1991, Turin, Italy.

Coefficient Memory 119 stores coefficients utilized by filter 127; the coefficients to be used are determined by the class identifiers (IDs) generated by class generators 115, 117, 121.

A class ID can be thought of as a specific value within the class that is used to describe and differentiate the target data from other data with respect to a particular characteristic. A class ID may be represented by a number, a symbol, or a code within a defined range. Thus, continuing with the discussion, a motion class ID is a specific value within the motion class used to indicate a particular level of motion quantity of the target data. For example, a motion class ID of "0" may be defined to indicate no motion, a motion class ID of "3" may be defined to indicate large motion.

Similarly, an error class ID is a specific value within the error class used to describe a particular distribution pattern of erroneous data in the neighborhood of the target data. For example, an error class ID of "0" may be defined to indicate that there is no erroneous data to the left and to the right of the target data; an error class ID of "1" may be defined to indicate that the data to the left of the target data is erroneous, etc.

A spatial class ID is a specific value within the spatial class used to classify the spatial pattern of the group or block containing the target data. An ADRC class ID is an example of a spatial class ID.

In the present embodiment, ADRC class generator 115, motion class generator 117 and error class generator 121 are used. Other class generators may be used. The class generators output a class ID based upon the pre-processed input data. For example, error class generator 121 generates an error class ID based upon the value of the error flag 105. Motion class generator 117 generates a motion class ID based upon the pre-processed data and the value of the error flag 105. ADRC class generator 115 generates an ADRC class ID based upon the pre-processed data, the motion class ID, and the error class ID. A detailed description of the generation of the class ID of different classes mentioned above is provided below.

Figure 3:
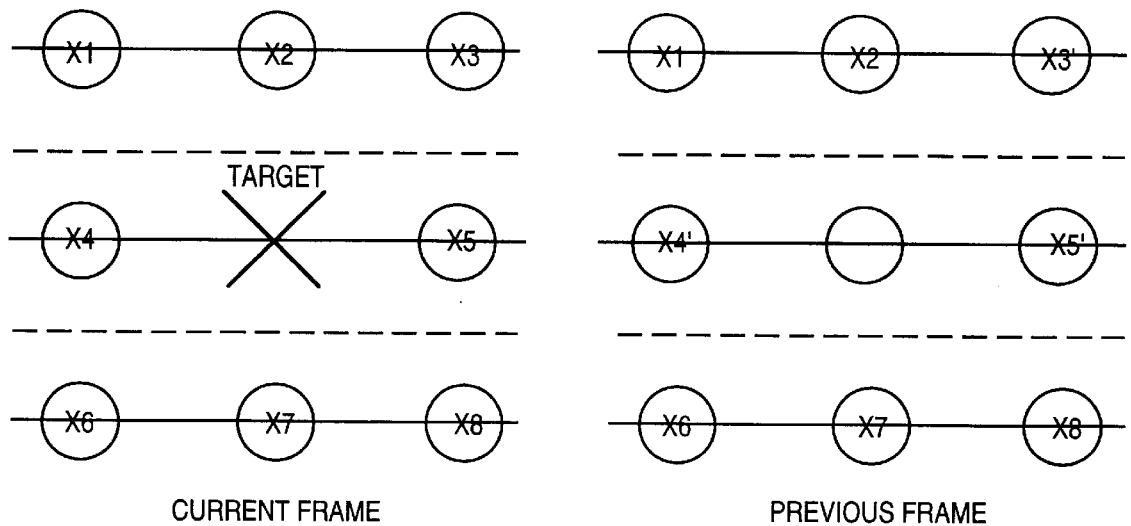
FIG. 3 illustrates a motion class tap structure in accordance with one embodiment of the present invention.

The motion class generator 117 generates a motion class ID based on the pre-processed data and the value of the error flag 105. FIG. 3 shows an example of motion class tap structures having 8 taps in the neighborhood of the target data. The accumulated temporal difference of the 8 taps are calculated according to formula 1 below and the motion class ID is generated according to formula 2. In this example, the motion class is defined to have four different motion class IDs 0, 1, 2, and 3, based on three pre-defined threshold values th0, th1, and th2. The motion class ID of the target data can be determined as follows:

$$fd = \sum_{i=1}^{8} |x_i - x'_i| \qquad \text{[formula 1]}$$

$$mc = \begin{cases} 0 & (0 \le fd < th0) \\ 1 & (th0 \le fd < th1) \\ 2 & (th1 \le fd < th2) \\ 3 & (th2 \le fd) \end{cases} \qquad \text{[formula 2]}$$

In the above formulas, fd represents an accumulated temporal difference, $x_i$ represents motion class tap data of the current frame, $x'_i$ represents the previous frame tap data corresponding to the current frame, and mc represents the motion class ID. In the present embodiment, three thresholds, th0, th1, th2, are used for motion classification. In one embodiment of the present invention, th0 equals 3, th1 equals 8, and th2 equals 24.

Figure 4:
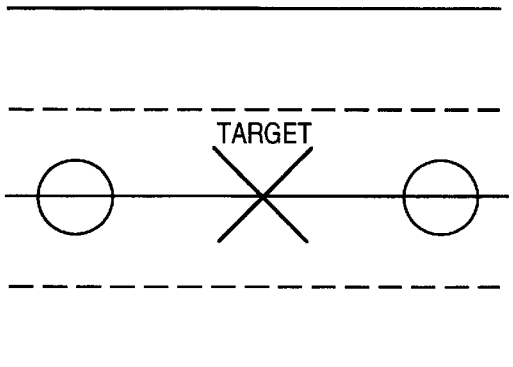
FIG. 4 illustrates an error class tap structure in accordance with one embodiment of the present invention.
Figure 4:
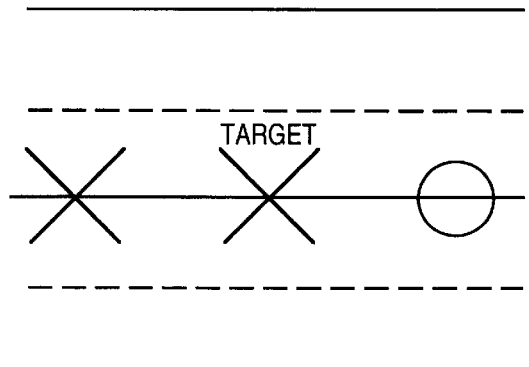
Figure 4:
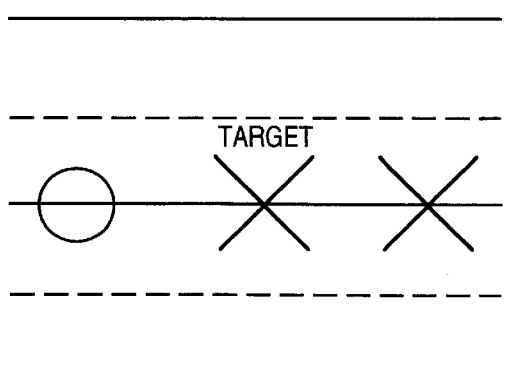
Figure 4:
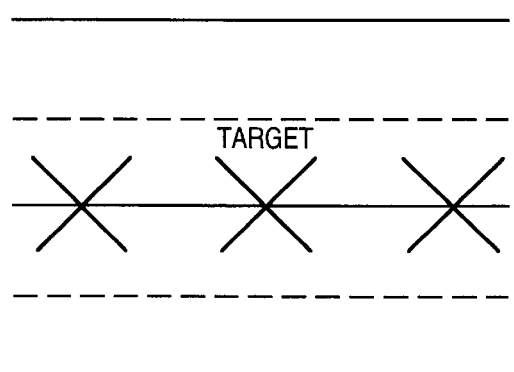

The error class generator 121 performs error classification to generate an error class ID according to the value of the error flag 105. FIG. 4 shows an example of an error class with four different error class IDs describing four different distribution patterns of erroneous data in the neighborhood of the target data. In this example, an error class ID of 0 indicates that there is no erroneous data to the left and to the right of the target data (independent error case); an error class ID of 1 means there is erroneous data to the left of the target data (left erroneous case); an error class ID of 2 means there is erroneous data to the right of the target data (right erroneous case); and an error class ID of 3 means there are erroneous data to the left and to the right of the target data (consecutive erroneous case).

Figure 5A:
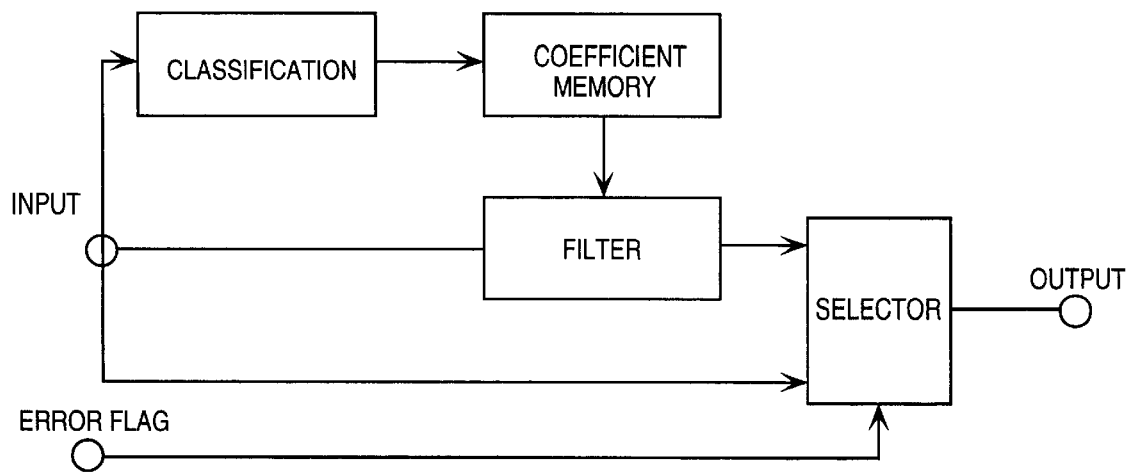
FIGS. 5a, 5b and 5c show a basic classified adaptive error recovery with the class tap structure and filter tap structure utilized in one embodiment of the present invention.
Figure 5B:
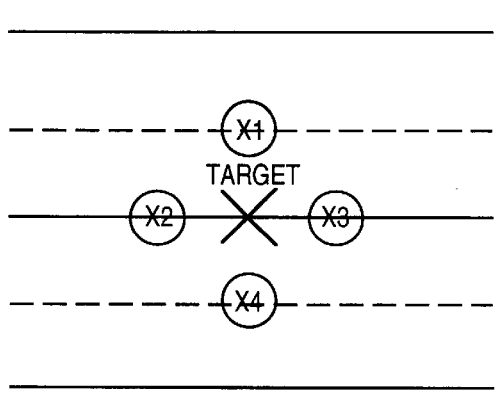
Figure 5C:
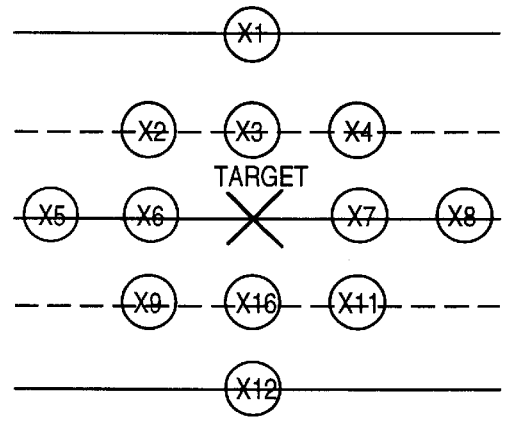
Figure 6A:
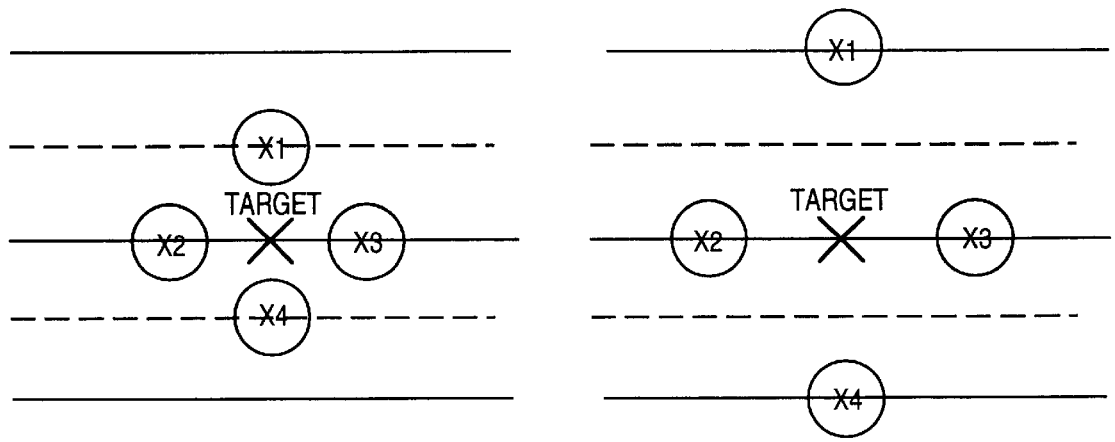
FIGS. 6a, 6b, 6c and 6d show various adaptive spatial class tap structures in accordance with one embodiment of the present invention.
Figure 6B:
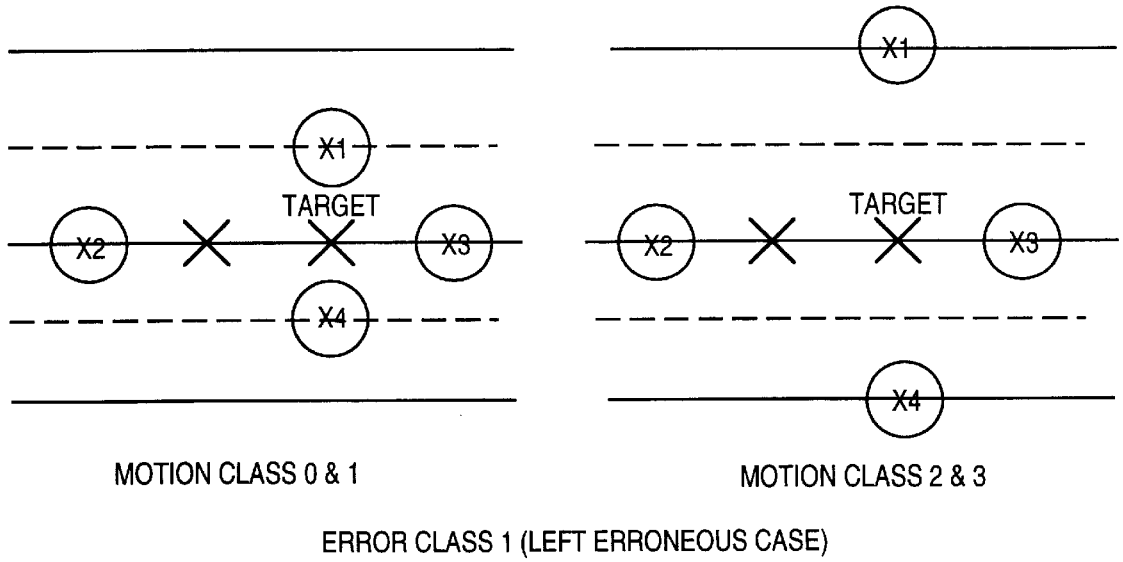
Figure 6C:
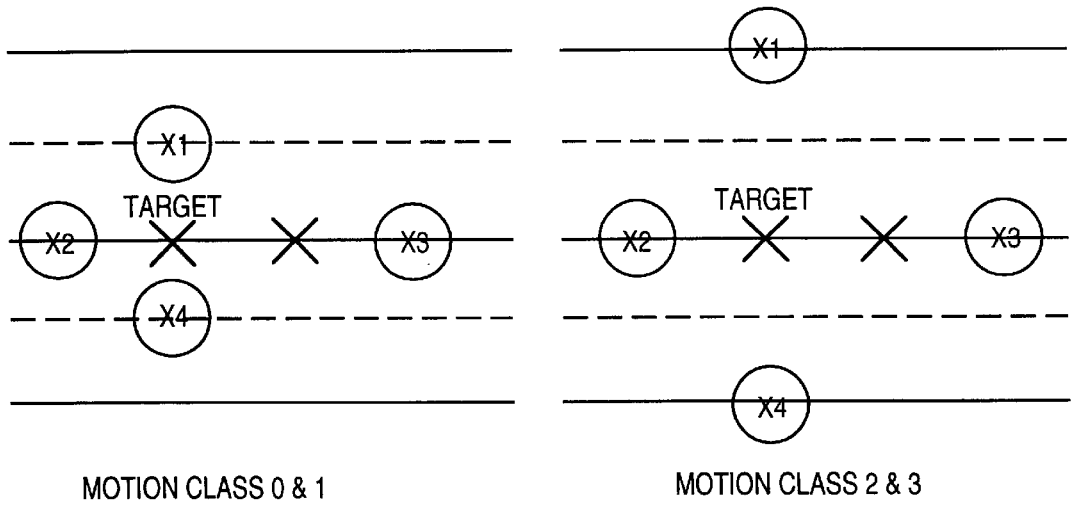
Figure 6D:
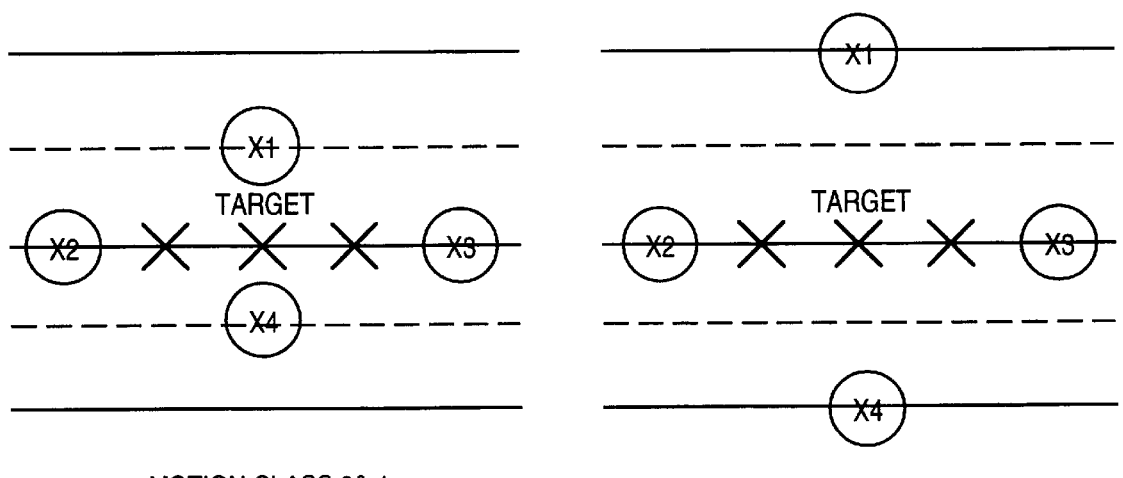

The Adaptive Dynamic Range Coding (ADRC) class generator 115 performs ADRC classification to generate an ADRC class ID. In FIG. 5, an example is shown where the number of class taps is four. In one embodiment using 1-bit ADRC, 16 ADRC class IDs are available as given by formula 5. An ADRC value is computed by formula 4, using a local dynamic range (DR) computed by formula 3, as shown below:

$$DR = MAX - MIN + 1 \quad \text{[formula 3]}$$

$$q_i = \left\lfloor \frac{(x_i - MIN + 0.5) \cdot 2^Q}{DR} \right\rfloor \quad \text{[formula 4]}$$

$$c = \sum_{i=1}^{4} 2^{i-1} \cdot q_i \quad \text{[formula 5]}$$

where DR represents the dynamic range of the four data area, MAX represents the maximum level of the four data, MIN represents the minimum level of the four data, $q_i$ is the ADRC encoded data, Q is the number of quantization bits, $\lfloor . \rfloor$ represents a truncation operation performed on the value within the square brackets, and c corresponds to an ADRC class ID. In 1-bit ADRC scheme, c has a value from 0 to 15 with Q=1.

In an alternate embodiment, an adaptive class tap structure is used to determine the ADRC class ID of the target data. An adaptive class tap structure is a class tap structure used in the multiple classification scheme. An adaptive class tap structure is used to more accurately represent the class tap structure of the area containing the target data since it describes more than one characteristic of the target data. In one embodiment represented by the structure of FIG. 1, spatial class taps are selected based upon the motion class ID and the error class ID of the target data as well as the preprocessed, data.

FIGS. 6a, 6b, 6c, and 6d show examples of various adaptive spatial class tap structures based on different combinations of the motion class ID and the error class ID. Thus, for each target data being analyzed, a proper ADRC adaptive spatial class tap structure is chosen according to the motion class ID generated by the motion class generator 117 and the error class ID generated by the error class generator 121. An ADRC class ID for the target data is generated based on the chosen adaptive class tap structure using the formulas described above.

Figure 7:
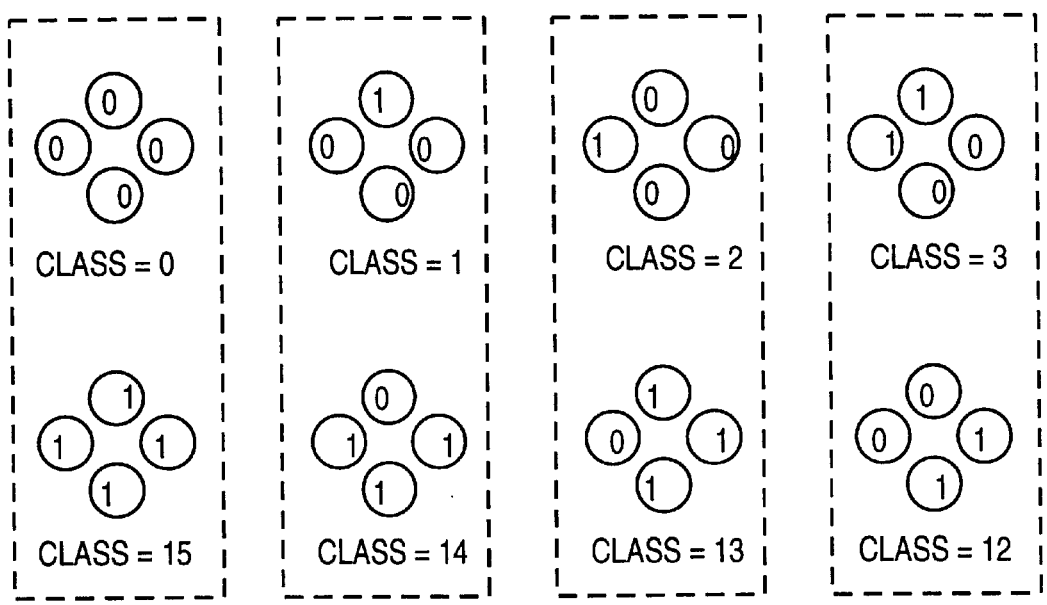
FIG. 7 shows an example of ADRC class reduction.
Figure 7:
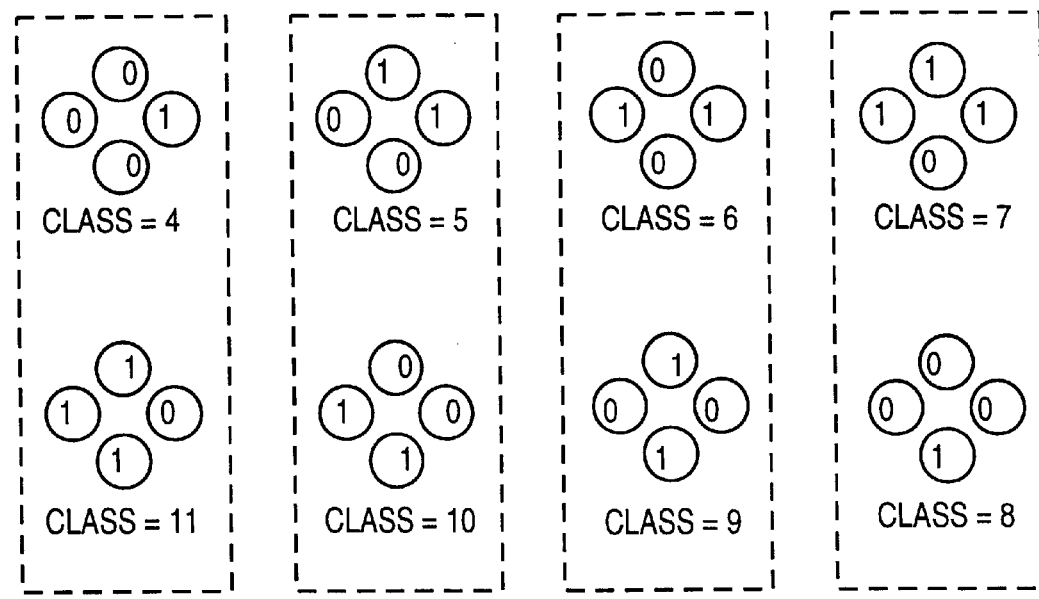

In one embodiment of the present invention, a spatial class reduction is used in the classified adaptive error recovery method. As explained above, the ADRC class is introduced as one type of spatial classification, and is given by [formula 5]. This classification method generates 16 class IDs using 4-tap 1-bit ADRC structure. As shown in FIG. 7, these 16 class IDs can be reduced to 8 class IDs according to [formula 6], shown below, $$c = \begin{cases} \sum_{i=1}^{4} 2^{i-1} \cdot q_i & (c < 2^3) \\ 2^4 - 1 - \sum_{i=1}^{4} 2^{i-1} \cdot q_i & (c \geq 2^3) \end{cases} \quad \text{[formula 6]}$$

where c corresponds to the ADRC class ID, $q_i$ is the quantized data and Q is the number of quantization bits based on [formula 3] and [formula 4].

In one embodiment, [formula 6] corresponds to a one's complement operation of binary data of the ADRC code, which is related to the symmetric characteristics of each signal wave form. Since ADRC classification is a normalization of the target signal wave form, two wave forms that have the relation of 1' complement in each ADRC code can be classified in the same class ID. It has been found that the number of ADRC class IDs may be halved by this reduction process.

Returning to FIG. 1, the filter tap selector 125 selects an appropriate adaptive filter tap structure for the target data. In the present embodiment, an adaptive filter tap structure is a set of taps defined based on one or more corresponding classes. For example, an adaptive filter tap structure may be defined based on a motion class ID, an error class ID, or both.

A multiple class can be thought of as a collection of specific values or sets of values used to describe at least two different characteristics of the target data. An exemplary definition of a multiple class is a combination of at least two different classes. For example, a particular classification scheme may define a multiple class as a combination of an error class, a motion class, and an ADRC class.

It follows that a multiple class ID is a specific value or specific set of values within the classes used to describe the target data with respect to at least two different characteristics of the target data. In one embodiment, a multiple class ID is represented by a set of different class IDs. For example, if the multiple class is defined as a combination of an error class, a motion class, and an ADRC class, a multiple class ID can be represented by a simple concatenation of these different class IDs.

In one embodiment, the multiple class ID can be used as, or translated into, the memory address to locate the proper filter coefficients and other information that are used to determine or estimate the value of the target data. In one embodiment, a simple concatenation of different class IDs for the multiple class ID is used as the memory address.

In one embodiment, the adaptive filter tap structure is defined based on the motion class ID and the error class ID of the target data. FIGS. 8a, 8b, 8c, and 8d show various adaptive filter tap structures corresponding to different combinations of a motion class ID and an error class ID.

Figure 8A:
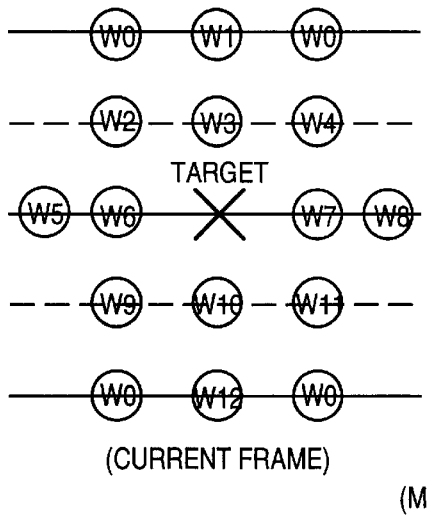
FIGS. 8a, 8b, 8c and 8d illustrate various adaptive filter tap structures in accordance with one embodiment of the present invention.
Figure 8A:
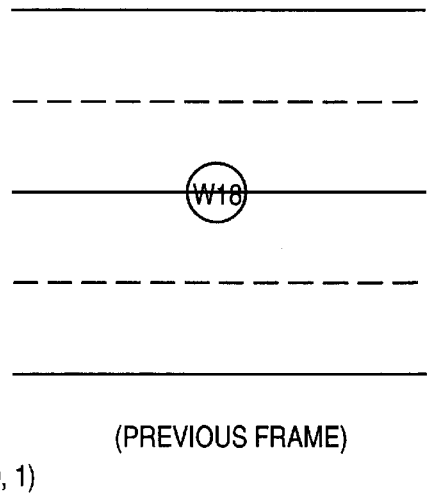
Figure 8A:
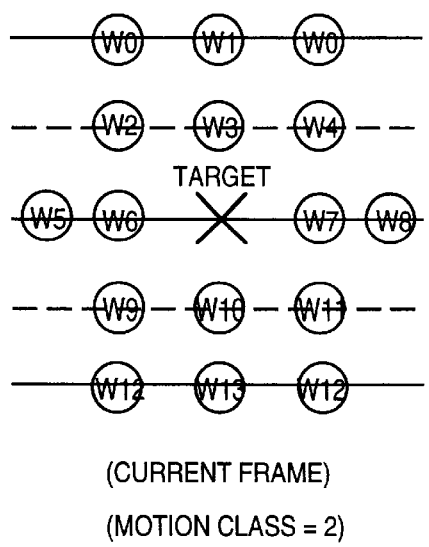
Figure 8A:
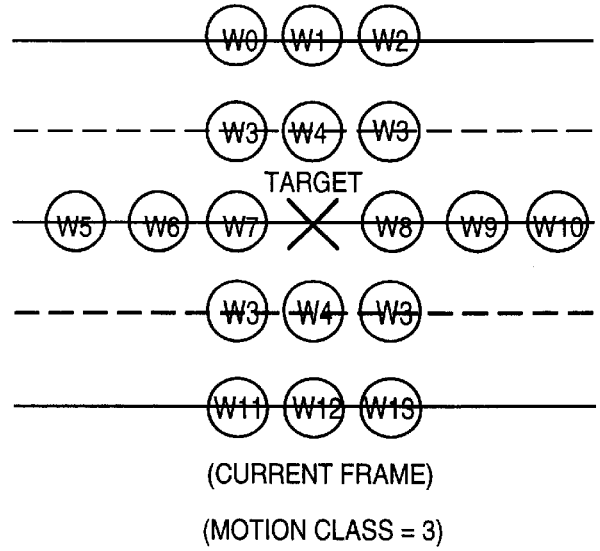
Figure 8B:
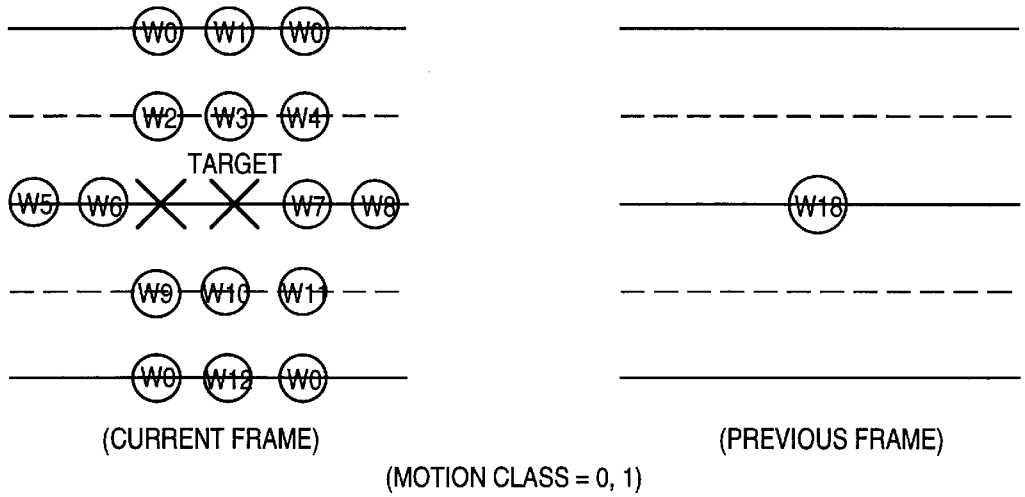
Figure 8B:
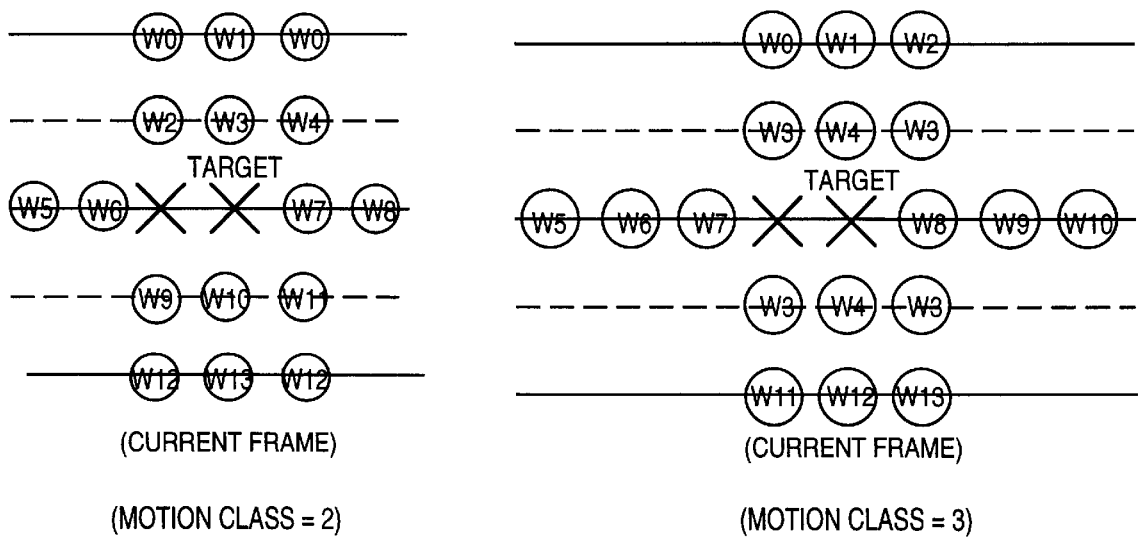
Figure 8C:
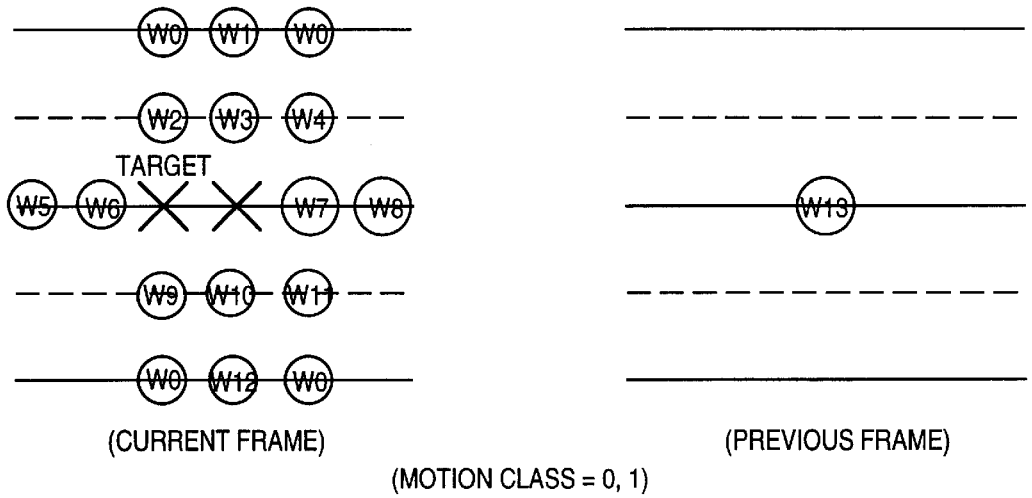
Figure 8C:
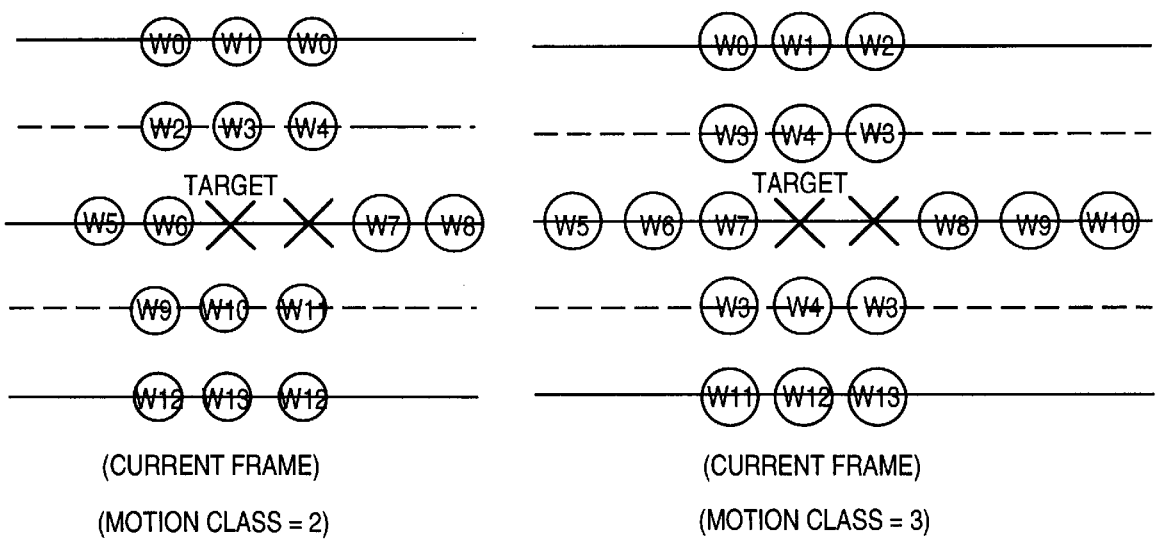
Figure 8D:
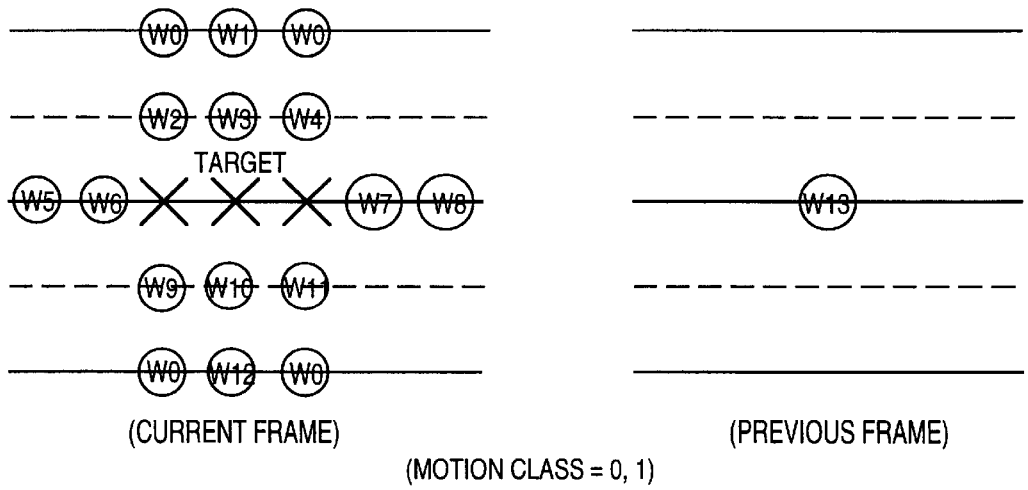
Figure 8D:
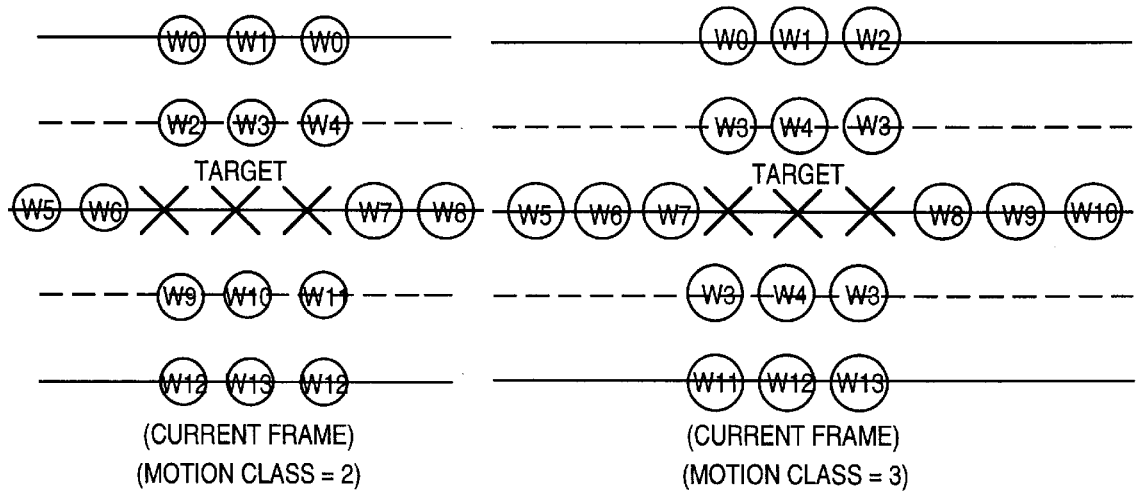

In FIG. 8d, the adaptive filter tap structure corresponding to the error class ID of 0 and the motion class ID of 3 has four coefficient taps that are the same, w3. Thus, some tap coefficients can be replaced by the same coefficient. As shown in FIG. 8d, there are four w3 coefficients that are located at horizontally and vertically symmetric locations and there are two w4 coefficients at horizontally symmetric locations. Thus one w3 coefficient can represent four taps and one w4 coefficient can represent two taps. As a result, 14 coefficients can represent 18 taps. This method can reduce coefficient memory and filtering hardware such as adders and multipliers. This method is referred to as the filter tap expansion. The filter tap expansion definition is achieved by evaluation of the coefficient distribution and the visual results. The proper filter tap structure for a particular target data can be retrieved from a location in a memory device such as a random access memory (RAM), using the motion class ID and the error class ID as the memory address. However, the proper filter tap structure for a target data can be generated or computed by other methods in accordance with the present invention.

The coefficient memory 119 provides a set of filter coefficients corresponding to the error class ID, the motion class ID, and the ADRC class ID of the target data. For each combination of an error class ID, a motion class ID, and an ADRC class ID, a corresponding filter is prepared for the adaptive processing. The filter can be represented by a set of filter coefficients. The filter coefficients can be generated by a training process that occurs as a preparation process prior to filtering. In one embodiment, the filter coefficients corresponding to the different combinations of error, motion, and ADRC class IDs are stored in a memory device such as a random access memory (RAM). Output data is generated according to the linear combination operation in formula 7 below:

$$y = \sum_{i=1}^{14} w_i \cdot x_i \quad \text{[formula 7]}$$

where $x_i$ is input filter tap data, $w_i$ corresponds to each filter coefficient, and y is the output data after error recovery.

Filter coefficients for each class ID, or each multiple class ID in a multiple classification scheme, are generated by a training process that occurs before the error recovery process. For example, training may be achieved according to the following criterion:

$$\min_W \|X \cdot W - Y\|_2 \quad \text{[formula 8]}$$

where X, W, and Y are the following matrices: X is the input filter tap data matrix defined by [formula 9], W is the coefficient matrix defined by [formula 10], and Y corresponds to the target data matrix defined by [formula 11].

$$X = \begin{pmatrix} x_{11} & x_{12} & \cdots & x_{1n} \\ x_{21} & x_{22} & \cdots & x_{2n} \\ \vdots & \vdots & \ddots & \vdots \\ x_{m1} & x_{m2} & \cdots & x_{mn} \end{pmatrix} \quad \text{[formula 9]}$$

$$W = \begin{pmatrix} w_1 \\ w_2 \\ \vdots \\ w_n \end{pmatrix} \quad \text{[formula 10]}$$

$$Y = \begin{pmatrix} y_1 \\ y_2 \\ \vdots \\ y_m \end{pmatrix} \quad \text{[formula 11]}$$

The coefficient $w_i$ can be obtained according to [formula 8] to minimize the estimation errors against target data. One set of coefficients corresponding to each class ID that estimates the target data may be determined by the training method described above.

Returning to FIG. 1, the filter 127 performs error recovery filtering to produce error recovered data based upon the filter tap data and the filter coefficients. In one embodiment, error recovered data with regard to FIGS. 8a, 8b, 8c, and 8d is generated according to the linear combination operation in formula 12 below:

$$y = \sum_{i=0}^{13} w_i \cdot x_i \quad \text{[formula 12]}$$

where $x_i$ is the filter tap data generated by the filter tap selector 125, using 14-tap adaptive filter tap structure as described previously, $w_i$ corresponds to each filter coefficient of the set of trained coefficients retrieved from the coefficient memory 119, and y is the output data of the filter 127 after error recovery filtering.

The noise reduction circuit 112 in FIG. 1, in one embodiment, performs noise reduction processing as follows. For stationary data, a process known as an inter-frame process is used to perform noise reduction. The pre-processed data is input to the multiplication logic 129 which performs a multiplication operation on the pre-processed data, using (1-K) as the weight, where K is a predetermined constant. The data retrieved from the frame memory 135 is input to the multiplication logic 133 which performs a multiplication operation on the data retrieved from the frame memory, using K as the weight. The data generated by the multiplication logic 129 and the multiplication logic 133 are added by the adder 131 to produce noise-reduced data for stationary pre-processed data. This process is also known as cross-fade operation.

For motion data, a process known as intra-field process can be used to perform noise reduction. The pre-processed data is input to a median filter 137 which generates noise-reduced data corresponding to the preprocessed data. The motion detection logic 139 checks the level of motion in the pre-processed data to generate a motion indicator depending on whether the level of motion in the pre-processed data exceeds a predetermined threshold value. For example, if the level of motion exceeds the predetermined threshold value, the motion indicator is set to "1", otherwise the motion indicator is set to "0".

The selector 141 selects either error recovered data or noise-reduced data based on the value of error flag 105 and the value of the motion indicator to produce the proper output data 143 of the system. In one embodiment, the selector 141 selects the error recovered data generated by the filter 127 as the output data 143 of the system if the error flag is set, for example, if the value of the error flag is "1". If the error flag is not set and the motion indicator is set, the selector 141 selects the output of the median filter as the output data 143 of the system. If the error flag is not set and the motion indicator is not set, the selector 141 selects the output of the adder 131 as the output data 143 of the system. Thus, the multiple processing system illustrated in FIG. 1 can selectively perform classified adaptive error recovery processing or noise reduction processing according to the value of the error flag.

Figure 9:
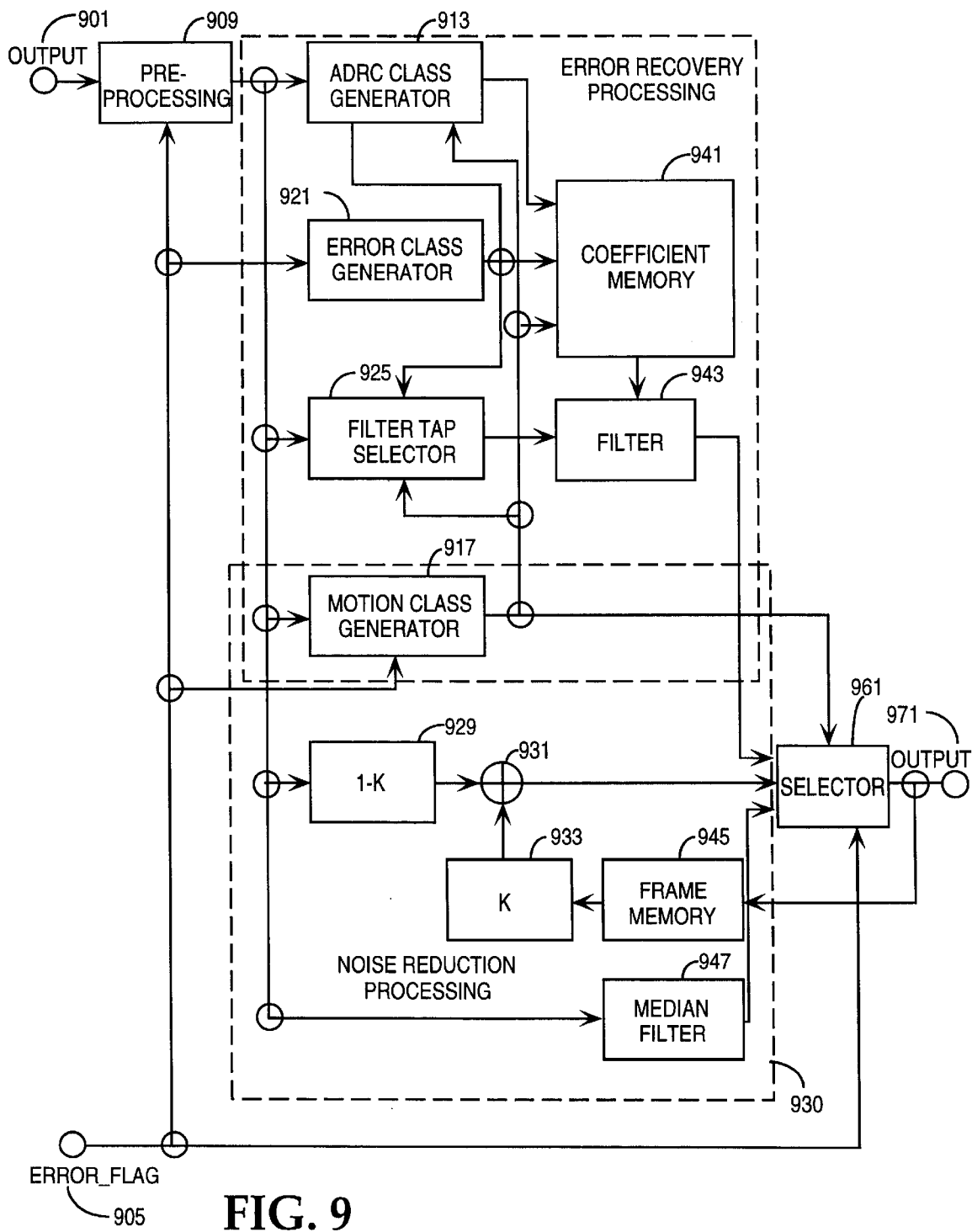
FIG. 9 shows a system block diagram of an alternate embodiment of a multiple processing system in accordance with one embodiment of the present invention.

FIG. 9 is a simplified block diagram of an alternate embodiment of a multiple processing system which is configured to selectively perform classified adaptive error recovery processing and noise reduction processing m a parallel structure. Since both error recovery processing and noise reduction processing include motion adaptive processing, the motion adaptive processing hardware can be shared between error recovery processing and noise reduction processing, which further reduces the hardware complexity and redundancy in a multiple processing system.

In this embodiment, the motion class generator 917 is shared by the error recovery circuit and the noise reduction circuit, thus eliminating the need for a separate motion detection logic that was required in the other configuration shown in FIG. 1. The error recovery processing is achieved in the same way described above. Input data 901 and corresponding error flags 905 are input to the system. The input data 901 is pre-processed by the pre-processor 909 to generate pre-processed data according to the input data 901 and the value of the error flag 905 as described above. The motion class generator 917 generates a motion class ID based on the pre-processed data and the value of the error flag 905. In this example, the motion class is defined to have four different motion class IDs: 0, 1, 2, and 3, based on three pre-defined threshold values of 3, 8, and 24. The error class generator 921 performs error classification to generate an error class ID according to the value of the error flag, as described above. In this example, the error class is defined to have four different error class IDs as follows: the error class ID of 0 (independent error case); the error class ID of 1 (left erroneous case); the error class ID of 2 (right erroneous case); and the error class ID of 3 (consecutive erroneous case).

The Adaptive Dynamic Range Coding (ADRC) class generator 913 performs ADRC classification to generate an ADRC class ID according to the pre-processed data, the motion class ID, and the error class ID. One embodiment of an ADRC classification process that utilizes an adaptive class tap structure based on the motion class ID and the error class ID and implements a spatial class reduction technique is described above. In the present example, the number of ADRC class IDs is 8. The filter tap selector 925 selects an appropriate adaptive filter tap structure for the target data based on the motion class ID and the error class ID of the target data.

In one embodiment, a 14-tap filter tap structure is used. In this example, the proper filter tap structure corresponding to the target data is retrieved from a memory device such as a random access memory (RAM), using the motion class ID and the error class ID as the memory address. However, the proper filter tap structure for a target data can be generated or computed by other methods in accordance with the teachings of the present invention.

The coefficient memory 941 generates a set of filter coefficients corresponding to the error class ID, the motion class ID, and the ADRC class ID of the target data. As mentioned previously, in one embodiment, the different sets of filter coefficients corresponding to different combinations of error, motion, and ADRC class IDs are obtained through a training process prior to the error recovery process and stored in memory device such as a RAM. In this example, the combination of an error class ID, a motion class ID, and an ADRC class ID are used as the memory address to point to the correct memory location from which the proper filter coefficients corresponding to the target data are retrieved.

In one embodiment, the memory address is a simple concatenation of an error class ID, a motion class ID, and an ADRC class ID. The memory address can also be computed as a function of an error class ID, a motion class ID, and an ADRC class ID.

The filter 943 performs error recovery filtering as described above to produce error recovered data based on the filter tap data and the filter coefficients.

The noise reduction circuit 930 in FIG. 9 performs noise reduction processing as described above with respect to FIG. 1, with one modification. Instead of using a separate motion detection logic to detect a level of motion in the pre-processed data and generate a motion indicator, the noise reduction circuit 930 uses the motion class generator 917 to generate a motion class ID that is also input to the selector 961. In this example, since the motion class generator 917 can generate one of four different motion class IDs, one or more of these motion class IDs can be used to indicate motion data while the other motion class IDs can be used to indicate stationary data for noise-reduced data selection purpose. In one embodiment, the motion class ID of 0 is used to indicate stationary data and other motion class IDs, namely 1, 2, and 3 are used to indicate motion data. The selector 961 selects either error recovered data or noise-reduced data based on the value of the error flag 905 and the motion class ID generated by the motion class generator 917. For example, if the value of the error flag is 1, the error recovered data generated by the filter 943 is selected by the selector 961 as the output data 971 of the system. If the value of the error flag is not 1 and the motion class ID is 0, the selector 961 selects the output of the adder 931 as the output data 971 of the system. If the value of the error flag is not 1 and the motion class ID is not 0, the selector 961 selects the output of the median filter 947 as the output data 971 of the system. Thus, the multiple processing system shown in FIG. 9 can selectively perform classified adaptive error recovery processing or noise reduction processing according to the value of the error flag.

Figure 10:
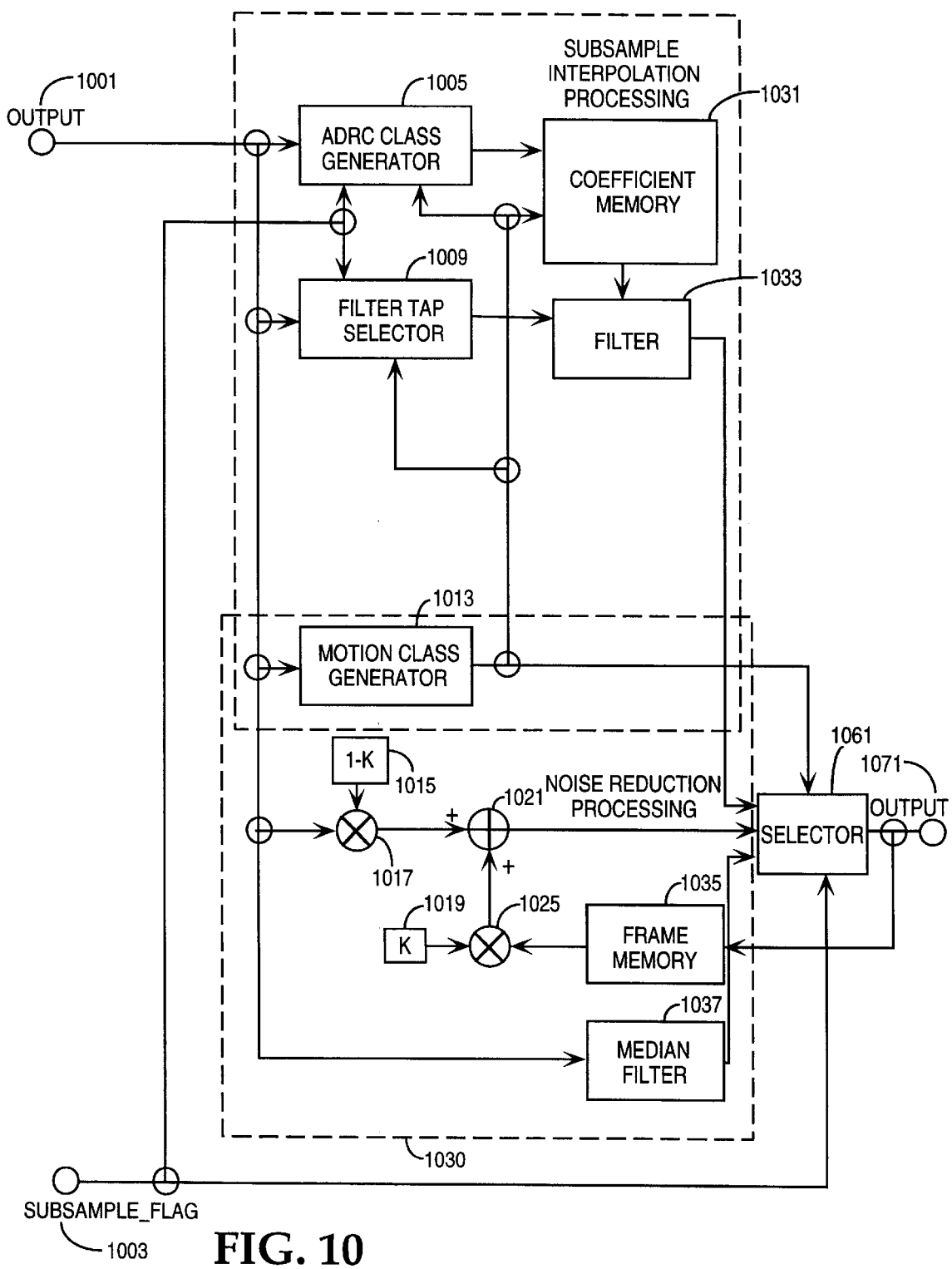
FIG. 10 depicts a system block diagram of another embodiment of a multiple processing system in accordance with one embodiment of the present invention.

FIG. 10 illustrates a block diagram for another embodiment of a multiple processing system that can selectively perform classified adaptive subsample interpolation processing and motion adaptive noise reduction processing in a parallel structure. Since both classified adaptive subsample interpolation and motion adaptive noise reduction include motion adaptive processing, the motion adaptive hardware can be shared between subsample interpolation processing and noise reduction processing, thus reducing the hardware complexity and hardware redundancy in the overall system.

In the configuration shown in FIG. 10, the motion class generator 1013 is shared by both subsample interpolation processing and noise reduction processing circuits, thus eliminating the need for a separate motion detection device that would normally be required in a noise reduction circuit, as shown in FIG. 1.

The classified adaptive subsample interpolation processing is performed as follows. Input data 1001 and corresponding subsample flags 1003 are input to the system. As described above, input data 1001 may be image, sound, or other correlated data. In one embodiment, input data 1001 is digital image data represented by discrete data points commonly known as pixels that are divided into disjoint sets known as blocks. The subsample flag 1003 is used to indicate the locations within the input data 1001 that contain samples to be interpolated. For example, the subsample flag 1003 may be used to indicate whether a particular data point being processed is a point to be interpolated. The motion class generator 1013 generates a motion class ID based on the input data 1001. In one embodiment, the motion class is defined to have four different motion class IDs: 0, 1, 2, and 3, based on three pre-defined threshold values of 3, 8, and 24.

The Adaptive Dynamic Range Coding (ADRC) class generator 1005 performs ADRC classification to generate an ADRC class ID according to the input data 1001, the motion class ID, and the value of the subsample flag 1003. One embodiment of an ADRC classification process that utilizes an adaptive class tap structure based on a motion class ID and implements a spatial class reduction technique is described above. In this example, the number of ADRC class IDs is 8. The filter tap selector 1009 selects an appropriate adaptive filter tap structure for the target data based on the motion class ID and the value of the subsample flag 1003. In this example, the filter tap structure corresponding to the target data is retrieved from a memory device such as a random access memory (RAM), using the motion class ID and the value of the subsample flag 1003 as the memory address. However, the filter tap structure to be used for a target data can be generated or computed by other methods in accordance with the present invention.

The coefficient memory 1031 generates a set of filter coefficients corresponding to the motion class ID and the ADRC class ID of the target data. The different sets of filter coefficients corresponding to different combinations of motion and ADRC class IDs are preferably obtained by a training process prior to the subsample interpolation process and stored in a memory device such as a RAM. The training process to generate different sets of filter coefficients is described above. In the present illustration, the combination of a motion class ID and an ADRC class ID may be used as the memory address to point to the correct memory location from which the proper filter coefficients corresponding to the target data are retrieved. In one embodiment, the memory address is a simple concatenation of a motion class ID and an ADRC class ID. The memory address can also be computed as a function of a motion class ID and an ADRC class ID. The filter 1033 performs filtering as described previously to produce subsample interpolated-data based on the filter tap data and the filter coefficients.

The noise reduction circuit 1030 in FIG. 10 performs noise reduction processing as described above with respect to FIGS. 8a, 8b, 8c, and 8d. In this example, since the motion class generator 1013 can generate one of four different motion class IDs, one or more of these motion class IDs can be used to indicate motion data while the other motion class IDs can be used to indicate stationary data for noise-reduced data selection purpose.

In one embodiment, the motion class ID of 0 is used to indicate stationary data and other motion class IDs, namely 1, 2, and 3 are used to indicate motion data. The selector 1061 selects either subsample interpolated data or noise-reduced data based on the value of the subsample flag 1003 and the motion class ID generated by the motion class generator 1013. For example, if the value of the subsample flag is 1, the subsample interpolated data generated by the filter 1033 is selected by the selector 1061 as the output data 1071 of the system. If the value of the subsample flag is not 1 and the motion class ID is 0, the selector 1061 selects the output of the adder 1021 as the output data 1071 of the system. If the value of the subsample flag is not 1 and the motion class ID is not 0, the selector 1061 selects the output of the median filter 1037 as the output data 1071 of the system. Thus, the multiple processing system shown in FIG. 10 can selectively perform classified adaptive subsample interpolation and noise reduction processing according to the value of the subsample flag.

Figure 11:
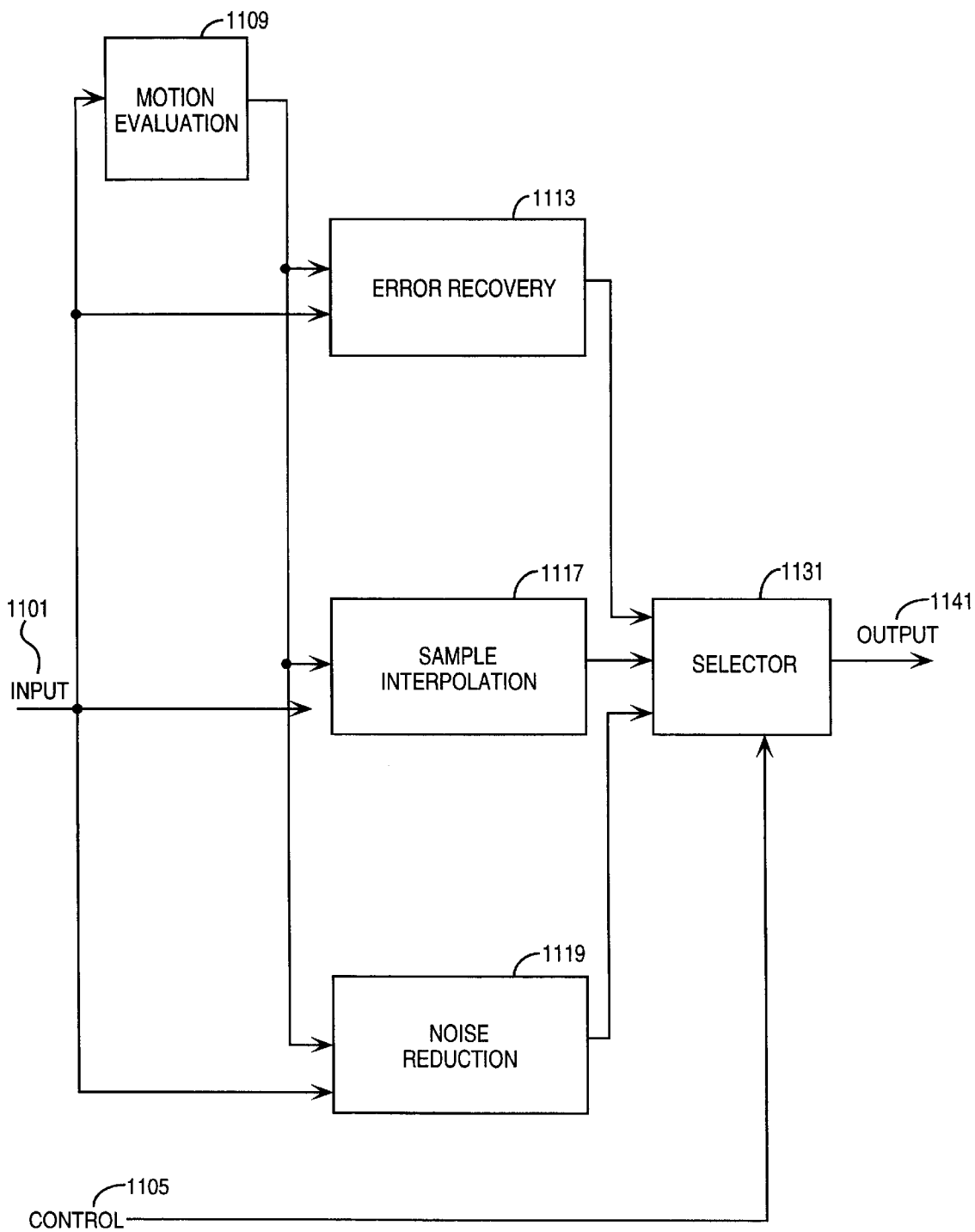
FIG. 11 illustrates a high level block diagram for a multiple processing system in accordance with one embodiment of the present invention combining error recovery processing, subsample interpolation processing, and noise reduction processing in a parallel structure.

FIG. 11 shows a high level system block diagram for another embodiment of a multiple processing system in accordance with the present invention that selectively performs error recovery processing, subsample interpolation processing, and noise reduction processing in a parallel structure. Input data 1101 and corresponding control input 1105 are input to the system. As mentioned above, the input data 1101 may be image, sound, or other correlated data. In one embodiment, the input data 1101 is digital image data represented by discrete data points that are divided into disjoint sets known as blocks. The control input 1105 may contain a plurality of input processing selection signals such as flags. In one embodiment, the control input 1105 includes an error flag and a subsample flag that are input to the selector 1131.

The motion evaluation device 1109, in one embodiment, detects a level of motion in the input data 1101 and generate a motion indicator based on the level of motion detected. The motion indicator may have different values depending on the level of motion detected. For example, a value of 0 may be defined to indicate no motion, a value of 1 may be defined to indicate little motion, etc. In one embodiment, the motion evaluation device 1109 may be configured to work as a motion class generator which generates a motion class ID based on the level of motion detected. As mentioned previously, a motion class generator can generate different class IDs based on the different levels of motion detected.

The error recovery circuit 1113 performs error recovery processing to generate error recovered data based on the input data 1101 and the output of the motion evaluation device 1109. The error recovery circuit 1113 may be a conventional error recovery system or a classified adaptive error recovery system described previously. The subsample interpolation circuit 1117 performs subsample interpolation processing to produce subsample interpolated data based on the input data 1101 and the output of the motion evaluation device 1109. The subsample interpolation circuit 1117 may be a conventional interpolation system or a classified adaptive subsample interpolation system which is described in detail above. The noise reduction circuit 1119 performs noise reduction processing as described above to produce noise-reduced data based on the input data 1101 and the output of the motion evaluation device 1109. The selector 1131 selects as output data 1141 of the system either the error recovered data, the subsample interpolated data, or the noise reduced data based on the value of the control input 1105. For example, if the control input 1105 contains an error flag and a subsample flag, the selector 1131 may perform the selection as follows. If the value of the error flag is "1", the error recovered data is selected as the output data 1141. If the value of the error flag is "0" and the value of the subsample flag is "1", then subsample interpolated data is selected as the output data 1141. If the value of the error flag is "0" and the value of the subsample flag is "0", then the noise-reduced data is selected as the output data 1141 of the system. Thus, the system shown in FIG. 11 can selectively perform error recovery, subsample interpolation, and noise reduction, in a parallel structure, based on the value of the control input 1105.

Figure 12:
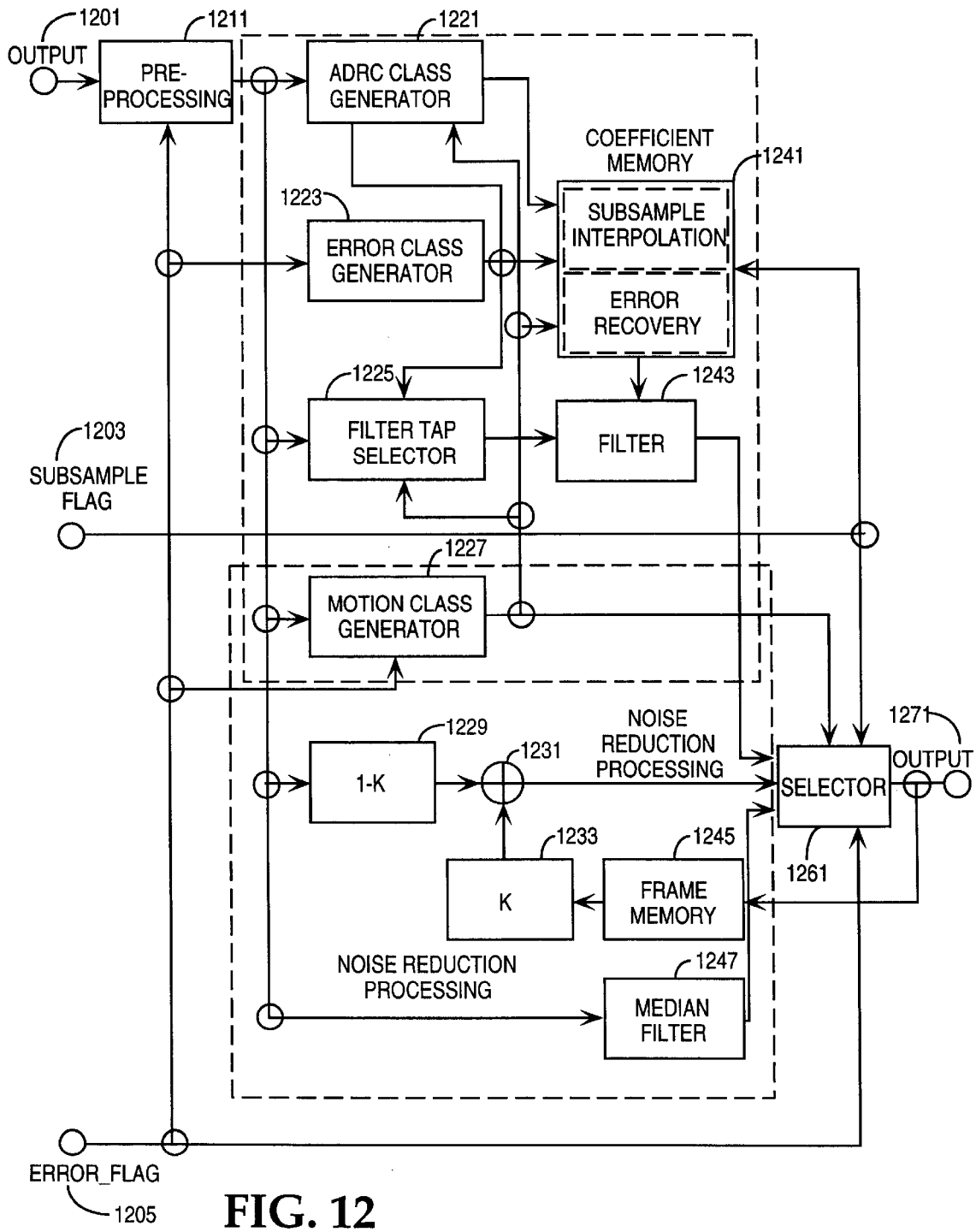
FIG. 12 shows a system block diagram of an alternate embodiment of a multiple processing system in accordance with one embodiment of the present invention.

FIG. 12 illustrates a block diagram for another embodiment of a multiple processing system that selectively performs, in a parallel structure, classified adaptive error recovery processing, classified adaptive subsample interpolation processing, and motion adaptive noise reduction processing. Since classified adaptive error recovery processing and classified adaptive subsample interpolation processing contain similar structures, hardware required for these two processes can be shared including but not limited to the ADRC class generator 1221, the filter tap selector 1225, the motion class generator 1227, the coefficient memory 1241, and the filter 1243. In addition, noise reduction processing also shares the motion class generator 1227. A configuration as illustrated in FIG. 12 eliminates the need for separate and redundant hardware that would normally be required if the different circuits mentioned above are operated separately or in serial, pipelined structures. As a result, hardware costs and complexity in the overall multiple processing system can be significantly reduced while operational efficiency and processing flexibility can be significantly increased.

Input data 1201, a subsample flag 1203, and an error flag 1205 are input to the multiple processing system. Input data 1201 may be image, sound, or other correlated data. In one embodiment, input data 1201 is digital image data represented by discrete data points, commonly known as pixels, that are divided into disjoint sets known as blocks. The subsample flag 1203 is used to indicate the locations in the input data 1201 that contain the target data to be interpolated. For example, the subsample flag 1203 may be defined to have a value of "1" if the data being processed is to be interpolated and to have a value of "0" otherwise. The error flag 1205 is used to indicate the locations in the input data that contain errors. For example, the error flag 1205 may be defined to have two different values depending on the whether the data being processed contains errors. In this example, the value of the error flag 1205 is "1" if the data being processed contain errors and the value of the error flag 1205 is "0" if the data being processed is error-free.

The input data 1201 is pre-processed by the preprocessor 1211 to generate the pre-processed data according to the input data 1201 and the value of the error flag 1205. The generation of pre-processed data is described previously.

The motion class generator 1227 performs motion classification to generate a motion class ID based on the pre-processed data and the value of the error flag 1205. In one embodiment, the motion class is defined to have four different motion class IDs: 0, 1, 2, and 3, based on three predefined threshold values of 3, 8, and 24.

The error class generator 1223 performs error classification to generate an error class ID according to the value of the error flag 1205 and the value of the subsample flag 1203. In this example, the error class is defined to have four different error class IDs as follows: the error class ID of "0" (independent error case); the error class ID of "1" (left erroneous case); the error class ID of "2" (right erroneous case); and the error class ID of "3" (consecutive erroneous case). If the error flag is set, e.g., having a value of 1, the error class generator 1223 performs error classification as described above to generate an error class ID. If the error flag is not set, e.g., having a value of 0, the error class generator generates a predetermined value that will be used in addressing the subsample memory area in the coefficient memory 1241, which will be discussed in detail subsequently.

The Adaptive Dynamic Range Coding (ADRC) class generator 1221 performs ADRC classification to generate an ADRC class ID according to the pre-processed data, the motion class ID, the error class ID, and the value of the subsample flag 1203. One embodiment of an ADRC classification process using an adaptive class tap structure based on a motion class ID and an error class ID and implementing a spatial class reduction technique is described above. If the subsample flag 1203 is set, an adaptive class tap structure corresponding to the target data to be used for subsample interpolation processing is chosen. If the subsample flag 1203 is not set, an adaptive class tap structure corresponding to the target data to be used for error recovery processing is chosen. In this example, the ADRC class is defined to have eight different ADRC class IDs.

The filter tap selector 1225 selects an appropriate adaptive filter tap structure for the target data based on the motion class ID, the error class ID, and the value of the subsample flag 1203. If the subsample flag 1203 is set, a filter tap structure corresponding to the target data to be used for subsample interpolation processing is selected. If the subsample flag 1203 is not set, a filter tap structure corresponding to the target data to be used for error recovery processing is selected. In one embodiment, a 14-tap filter tap structure is used. In this example, the filter tap structure corresponding to the target data is retrieved from a memory device such as a random access memory (RAM), using the value of the subsample flag 1203, the motion class ID, and the error class ID as the memory address. However, the filter tap structure to be used for a particular target data can be generated or computed by other methods in accordance with the present invention.

The coefficient memory 1241 generates a set of filter coefficients corresponding to the value of the subsample flag 1203, the error class ID, the motion class ID, and the ADRC class ID of the target data. As mentioned previously, in one embodiment, the different sets of filter coefficients corresponding to different combinations of different class IDs are obtained through a training process and stored in memory device such as a RAM.

In the present embodiment, the filter coefficients to be used for error recovery processing are stored in one area of the coefficient memory 1241 and the filter coefficients to be used for subsample interpolation processing are stored in a different area of the coefficient memory 1241. The value of the subsample flag is used to point to the correct area in the coefficient memory from which the appropriate filter coefficients for either error recovery or subsample interpolation are to be retrieved. In this example, the combination of the value of the subsample flag 1203, an error class ID, a motion class ID, and an ADRC class ID is used as the memory address to point to the correct memory location from which the proper filter coefficients corresponding to the target data are retrieved.

In one embodiment, a simple concatenation of the value of the subsample flag 1203, the error class ID, the motion class ID, and the ADRC class ID is used as the memory address to retrieve the proper filter coefficients. The memory address can also be computed as a function of the value of the subsample flag 1203, the error class ID, the motion class ID, and the ADRC class ID.

The filter 1243 performs filtering as described above using the filter tap data generated by the filter tap selector 1225 and the filter coefficients provided by the coefficient memory 1241 to produce either error recovered data or subsample interpolated data.

The noise reduction circuit 1230 in FIG. 12 performs noise reduction processing as described above with respect to FIGS. 1, 9, and 10. In this example, since the motion class generator 1227 can generate one of four different motion class IDs, one or more of these motion class IDs can be used to indicate motion data while the other motion class IDs can be used to indicate stationary data for noise-reduced data selection purpose. In one embodiment, the motion class ID of 0 is used to indicate stationary data and other motion class IDs, namely 1, 2, and 3 are used to indicate motion data.

The selector 1261 selects as output data 1271 of the system either error recovered data, subsample interpolated data, or noise-reduced data based on the value of the error flag 1205, value of the subsample flag 1203 and the motion class ID generated by the motion class generator 1227. In one embodiment, the selector 1261 performs the output selection process according to the output selection truth table shown in FIG. 13.

FIG. 13 illustrates an output selection truth table for selecting proper data generated by the multiple processing system shown in FIG. 12 above. The selection of proper output data is accomplished by examining the value of the error flag 1301, the value of the subsample flag 1305, and the motion class ID 1309. As shown in table, the error flag 1301 has a value of 1 when it is set and a value of 0 when it is not set. Likewise, the subsample flag 1305 is assigned a value of 1 when it is set and a value of 0 when it is not set. A motion class ID of 0 indicates stationary data while another motion class, for example, motion class of 1 or 2 indicates motion data. Error-recovered data is selected if the error flag 1301 is set. Subsample-interpolated data is selected if the error flag 1301 is not set and the subsample flag 1305 is set. Noise-reduced stationary data is selected if neither the error flag 1301 nor the subsample flag 1305 is set, and the motion class ID 1309 has a value of 0. Finally, noise-reduced motion data is selected if neither the error flag 1301 nor the subsample flag 1305 is set, and the motion class ID 1309 is not 0. Thus, the multiple processing system shown in FIG. 12 can selectively perform classified adaptive error recovery, classified adaptive subsample interpolation, and noise reduction based on the value of the error flag 1205 and the value of the subsample flag 1203.

Figure 14:
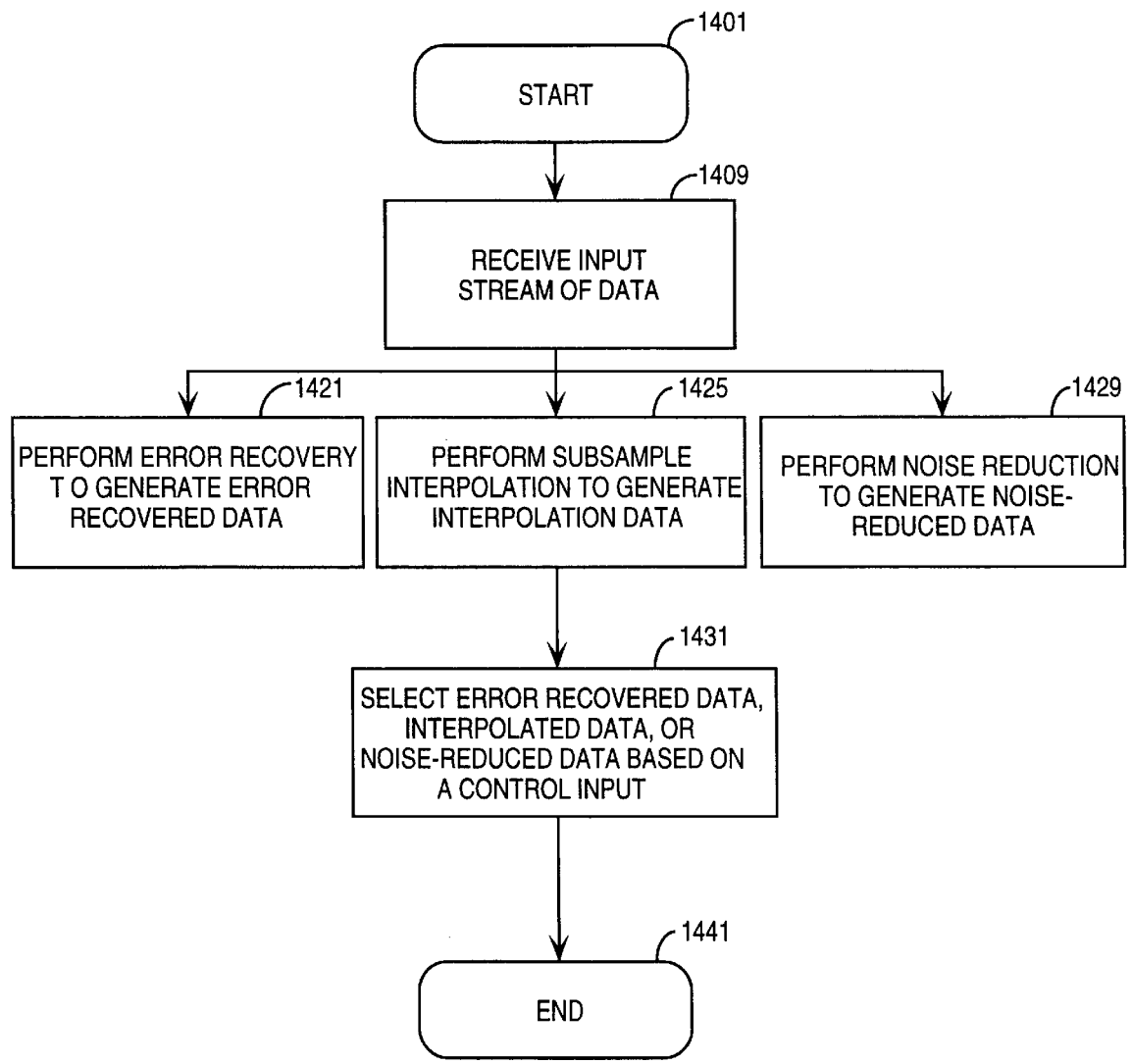
FIG. 14 illustrates one embodiment of a method for selectively performing error recovery processing, subsample interpolation processing, and noise reduction processing in a multiple, parallel processing system.

FIG. 14 shows a method for selectively performing, in a parallel manner, error recovery processing, subsample interpolation processing, and noise reduction processing in accordance with the teachings of the present invention. Input stream of data is received at 1409. Error recovery processing is performed on the input stream of data at 1421 to generate error-recovered data. At 1425, subsample interpolation processing is performed on the input stream of data to generate subsample-interpolated data. Noise reduction processing is performed on the input stream of data at 1429 to generate noise-reduced data. At 1431, a selection of either error-recovered data, subsample-interpolated data, or noise-reduced data is performed according to a control input to generate an output of data.

Figure 15:
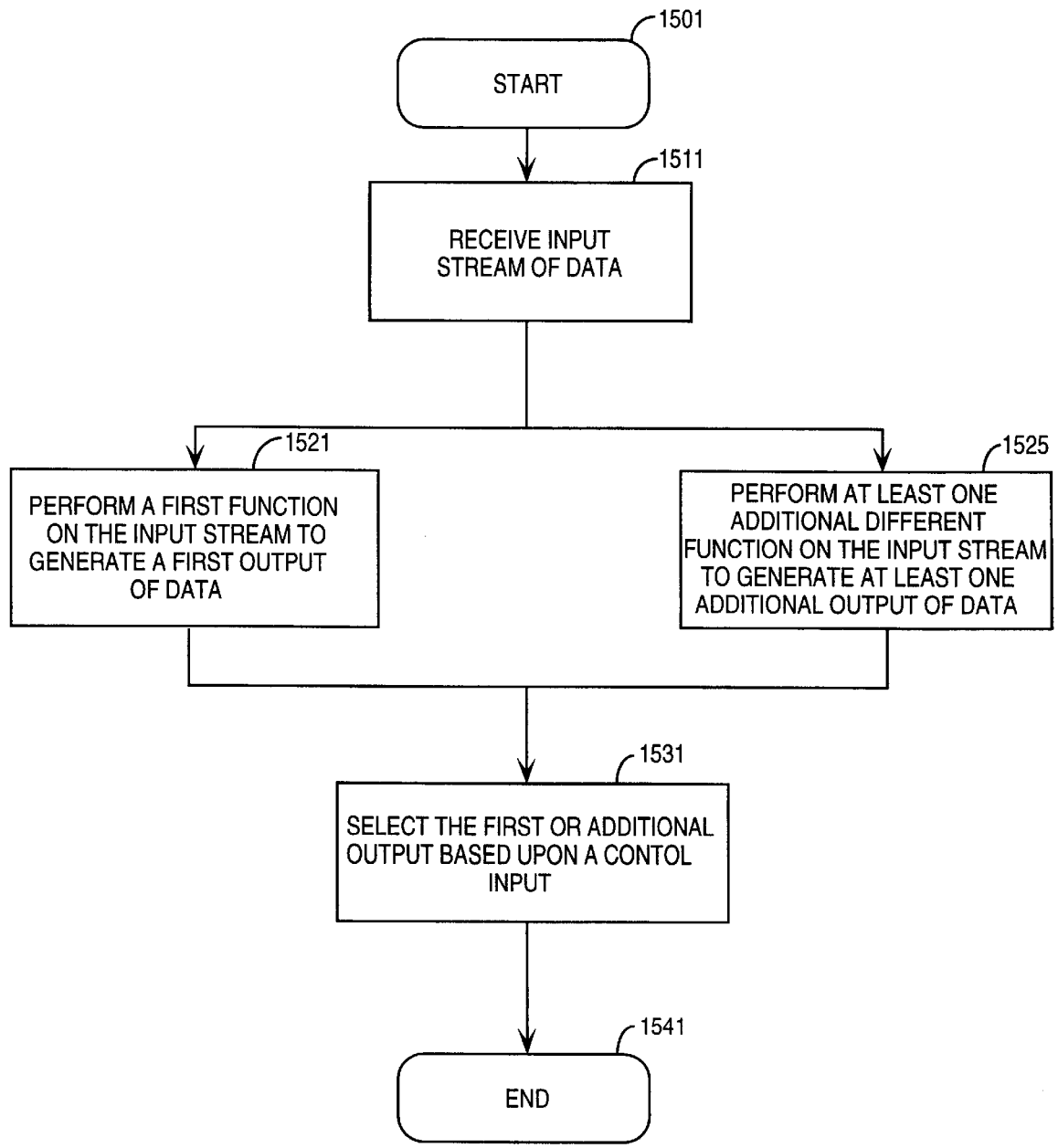
FIG. 15 illustrates one embodiment of a generalized method for performing multiple functions on input data in a multiple, parallel processing system.

FIG. 15 illustrates a generalized method for selectively performing, in a parallel manner, different functions on an input stream of data in accordance with the teachings of the present invention. At 1511, the input stream of data is received. A first function is performed on the input stream of data at 1521 to generate a first output of data. At 1525, at least one additional different function is performed on the input stream of data to generate at least one additional output of data. At 1531, a selection of either the first output of data or the additional output of data is performed based upon a control input to generate proper data output.

What is claimed is:

1. An apparatus for performing dissimilar processing functions substantially in parallel on an input bitstream, the apparatus comprising:
   an input coupled to receive the input bitstream;
   a control input coupled to receive control data to select output from one of the dissimilar processing functions;
   a first device coupled to the input, said first device configured to recover erroneous data contained in the input bitstream;
   a second device coupled to the input, said second device configured to reduce the noise level of the input bitstream; and
   a select device coupled to the first device, second device and the control input, the select device configured to select as output data, the output of the first device or second device based upon the control data.

2. The apparatus of claim 1 wherein the control data comprises an error flag, said select device further configured to select as output data, the output of the first device if the error flag is set or the output of the second device if the error flag is not set.

3. The apparatus of claim 1 further comprising:
   a motion-detect device coupled to the input, the first device and second device, said motion-detect device configured to determined a level of change in the input data and generate an output of motion data, said first and second devices further configured to use the motion data to perform their corresponding functions.

4. An apparatus for performing dissimilar processing functions substantially in parallel on an input bitstream, the apparatus comprising:
   an input coupled to receive the input bitstream;
   a control input coupled to receive control data to select output from one of the dissimilar processing functions;
   a first device coupled to the input, said first device configured to interpolate the input bitstream;
   a second device coupled to the input, said second device configured to reduce the noise level of the input bitstream; and
   a select device coupled to the first device, second device and the control input, the select device configured to select as output data, the output of the first device or second device based upon the control data.

5. The apparatus of claim 4 wherein the control data comprises a subsample flag, said select device further configured to select as output data, the output of the first device if the subsample flag is set or the output of the second device if the first subsample is not set.

6. The apparatus of claim 4 further comprising:
   a motion-detect device coupled to the input, the first device and a second device, said motion-detect device configured to determine a level of change in the input data and generate an output of motion data, said first and second devices further configured to use the motion data to perform their corresponding functions.

7. An apparatus for performing dissimilar processing functions substantially in parallel on an input bitstream, the apparatus comprising:
   an input coupled to receive the input bitstream;
   a control input coupled to receive control data to select output from one of the dissimilar processing functions;
   a first device coupled to the input, said first device configured to receive the input bitstream and recover erroneous data contained in the input bitstream;
   a second device coupled to the input, said second device configured to receive the input bitstream and interpolate the input bitstream;
   a third device coupled to the input, said third device configured to receive the input bitstream and reduce the noise level of the input bitstream; and
   a select device coupled to the first, second and third devices and the control input, the select device configure to select as output data the output of the first device, the output of the second device, or the output of the third device based upon the control data.

8. The apparatus of claim 7 wherein the control data is selected from the group comprising an error flag and a subsample flag.

9. The apparatus of claim 7 further comprising:
   a motion-detect device coupled to the input, the first device, the second device and the third device, said motion detect device configured to determine a level of change in the input data and generate an output of motion data, said first, second and third devices further configured to use the motion data to perform their corresponding functions.

10. A method of performing dissimilar processing functions substantially in parallel on an input stream of data, the method comprising:
    receiving the input stream of data;
    receiving control data to select output from one of the dissimilar processing functions;
    recovering erroneous data in the input stream to generate a first output of error-recovered data;
    interpolating, in parallel to the recovering, the input stream to generate a second output of interpolated data;
    reducing, in parallel to the step of interpolating, the noise level of the input stream to generate a third output of noise-reduced data; and
    selecting the first, second or third output based upon the control data.

11. The method of claim 10 further comprising:
    detecting a change in the input stream to generate an output of motion data.

12. A computer-readable medium comprising instructions which, when executed by a processor, cause said processor to perform dissimilar processing functions substantially in parallel on an input stream of data comprising:

reading the input stream of data readable by said processor;

reading control data readable by said processor to select output from one of the dissimilar processing functions;

recovering erroneous data in the input stream to generate a first output of error-recovered data;

interpolating the input stream to generate a second output of interpolated data; reducing the noise level of the input stream to generate a third output of noise-reduced data; and selecting the first, second, or third output based upon the control data.

13. The computer-readable medium of claim 12 further comprising:

detecting a change in the input stream to generated an output of motion data.

14. An apparatus for performing dissimilar processing functions substantially in parallel on an input stream of data, the apparatus comprising:

means for receiving the input stream of data;

means for receiving control data to select output from one of the dissimilar processing functions;

means for recovering erroneous data in the input stream to generate a first output of error-recovered data;

means for interpolating, in parallel to the means for recovering, the input stream to generate a second output of interpolated data;

means for reducing, in parallel to the means for interpolating, the noise level of the input stream to generate a third output of noise-reduced data and means for selecting the first, second and third output based upon the control data.

15. An apparatus for performing dissimilar processing functions substantially in parallel on correlated input data, the apparatus comprising:

an input coupled to receive the input data;

a control input coupled to receive control data to select output from one of the dissimilar processing functions;

at least one class generator coupled to generate a class ID based upon the input data and control data;

a coefficient memory device coupled to the at least one class generator, the coefficient memory device configured to generate filter-coefficient data based upon the class ID and the control data;

a filter tap selector coupled to the input and the at lease one class generator, the filter tap configured to generate filter tap data based upon the input data, the control data, and the class ID;

a filter coupled to the filter tap selector and the coefficient memory device, the filter configured to generate filtered data based upon the filter tap data and the filter-coefficient data;

noise-reduction logic coupled to the input and the at least one class generator, the noise-reduction logic to generate noise-reduced data; and a select device couple to the filter and the noise-reduction logic, the select device configured to select as output data, the filter data or the noise-reduced data based upon the control data.

\* \* \* \* \*